(12) United States Patent (10) Patent No.: US 8,381,174 B2
Rogers (45) Date of Patent: Feb. 19, 2013

(54) GLOBAL VARIABLE STRUCTURE IN A GRAPHICAL PROGRAM

(75) Inventor: Steven W. Rogers, Austin, TX (US)

(73) Assignee: National Instruments Corporation, Austin, TX (US)

( * ) Notice: Subject to any disclaimer, the term of this patent is extended or adjusted under 35 U.S.C. 154(b) by 1270 days.

(21) Appl. No.: 11/931,177

(22) Filed: Oct. 31, 2007

(65) Prior Publication Data

US 2009/0113337 A1 Apr. 30, 2009

(51) Int. Cl.
*G06F 9/44* (2006.01)
(52) U.S. Cl. ......... 717/105; 717/109; 717/113; 717/119
(58) Field of Classification Search .................. None
See application file for complete search history.

(56) References Cited

U.S. PATENT DOCUMENTS

| | | | | |
|---|---|---|---|---|
| 5,187,788 A * | 2/1993 | Marmelstein | ................ | 717/109 |
| 5,475,851 A | 12/1995 | Kodosky et al. | | |
| 5,481,741 A | 1/1996 | Kodosky et al. | | |
| 5,555,417 A | 9/1996 | Odnert et al. | | |
| 5,680,619 A * | 10/1997 | Gudmundson et al. | ....... | 717/109 |
| 5,732,277 A | 3/1998 | Kodosky et al. | | |
| 5,765,142 A * | 6/1998 | Allred et al. | .................. | 717/109 |
| 6,282,699 B1 * | 8/2001 | Zhang et al. | ................. | 717/109 |
| 6,286,130 B1 * | 9/2001 | Poulsen et al. | ................ | 717/119 |
| 6,311,323 B1 * | 10/2001 | Shulman et al. | ............. | 717/113 |
| 6,321,373 B1 * | 11/2001 | Ekanadham et al. | ......... | 717/119 |
| 7,137,100 B2 * | 11/2006 | Iborra et al. | ................... | 717/109 |
| 7,210,117 B2 * | 4/2007 | Kudukoli et al. | ............ | 717/100 |
| 7,526,755 B2 * | 4/2009 | DeLine et al. | ................ | 717/126 |
| 7,568,192 B2 * | 7/2009 | Mitchell et al. | ............... | 717/159 |
| RE41,228 E * | 4/2010 | Kodosky et al. | .............. | 715/771 |
| 7,712,080 B2 * | 5/2010 | Pan et al. | ....................... | 717/119 |
| 7,720,656 B2 * | 5/2010 | Raghavan et al. | ................ | 703/6 |
| 7,814,461 B2 * | 10/2010 | Shulman et al. | ............. | 717/109 |
| 7,814,465 B2 * | 10/2010 | Liu | ............................... | 717/126 |
| 7,941,438 B2 * | 5/2011 | Molina-Moreno et al. | ... | 717/105 |
| 8,028,299 B2 * | 9/2011 | Holt | ............................ | 717/119 |
| 8,037,449 B2 * | 10/2011 | Iborra et al. | ................... | 717/105 |
| 8,065,658 B1 * | 11/2011 | Bali et al. | ...................... | 717/113 |
| 8,141,031 B2 * | 3/2012 | Iborra et al. | .................. | 717/113 |
| 8,191,052 B2 * | 5/2012 | Chamieh et al. | .............. | 717/105 |
| 2004/0226006 A1 * | 11/2004 | Russell | ......................... | 717/105 |
| 2007/0006145 A1 * | 1/2007 | Hill et al. | ....................... | 717/113 |

(Continued)

OTHER PUBLICATIONS

National Instruments, "LabVIeW Real-Time Module User Manual, Apr. 2003 Edition", 2003; [retrieved on Aug. 15, 2011]; Retrieved from Internet <URL:http://www.ni.com/pdf/manuals/322154d.pdf>; pp. 1-97.*

(Continued)

*Primary Examiner* — Thuy Dao
*Assistant Examiner* — Xi D Chen
(74) *Attorney, Agent, or Firm* — Meyertons Hood Kivlin Kowert & Goetzel, P.C.; Jeffrey C. Hood; Joel L. Stevens

(57) ABSTRACT

System and method for deterministic modification of global variables in a graphical program. Input including the structure in the graphical program may be received, where the structure is displayed in the graphical program. At least one graphical program node is associated with the structure. The at least one graphical program node may be executable to modify the value of a global variable. During execution of the graphical program the structure ensures deterministic modification of values of the global variable.

10 Claims, 25 Drawing Sheets

U.S. PATENT DOCUMENTS

| | | | |
|---|---|---|---|
| 2010/0031231 A1* | 2/2010 | Ilic et al. | 717/105 |
| 2010/0131925 A1* | 5/2010 | Gutfleisch | 717/113 |
| 2010/0318963 A1* | 12/2010 | Kajiya | 717/119 |
| 2011/0083124 A1* | 4/2011 | Moskal et al. | 717/126 |

OTHER PUBLICATIONS

National Instruments, "LabVIeW User Manual, Apr. 2003 Edition", 2003; [retrieved on Aug. 16, 2011]; Retrieved from Internet <URL:http://www.ni.com/pdf/manuals/320999e.pdf>; pp. 1-349.*

National Instruments, "LabVIeW Development Guidelines, Apr. 2003 Edition", 2003; [retrieved on Aug. 16, 2011]; Retrieved from Internet <URL:http://www.ni.com/pdf/manuals/321393d.pdf>; pp. 1-101.*

Kodosky, et al., "Visual Programming Using Structured Data Flow", IEEE, 1991; [retrieved on Aug. 12, 2011]; Retrieved from Internet <URL:http://ieeexplore.ieee.org/stamp/stamp.jsp?tp=&arnumber=238853>; pp. 34-39.*

C. Flanagan, S. Freund, "Type-Based Race Detection for Java", 2000 ACM; [retrieved on Aug. 22, 2011]; Retrieved from Internet <URL:http://dl.acm.org/citation.cfm?id=349328>; pp. 1-14.*

C. Flanagan, S. Qadeer, "A Type and Effect System for Atomicity", 2003 ACM; [retrieved on Aug. 22, 2011]; Retrieved from Internet <URL:http://dl.acm.org/citation.cfm?id=781169>; pp. 1-12.*

C. Boyapati, S. Rinard, "A Parameterized Type System for Race-Free Java Programs", 2001 ACM; [retrieved on Aug. 22, 2011]; Retrieved from Internet <URL:http://dl.acm.org/citation.cfm?id=504287>; pp. 56-69.*

C. Boyapati, et al., "Ownership Types for Safe Programming: Preventing Data Races and Deadlocks", 2002 ACM; [retrieved on Aug. 22, 2011]; Retrieved from Internet <URL:http://dl.acm.org/citation.cfm?id=582440>; pp. 211-230.*

J. Rose, et al., "Dynamic inference of polymorphic lock types", 2003 Elsevier B.V.; [retrieved on Aug. 22, 2011]; Retrieved from Internet <URL:http://sciencedirect.com/science/article/pii/S0167642305000705>; pp. 266-283.*

Dolby, et al., "A Data-Centric Approach to Synchronization", 2012 ACM; [retrieved on Oct. 18, 2012]; Retrieved from Internet <URL:http://dl.acm.org/citation.cfm?id=2160910>;pp. 4:1-4:48.*

Hatcliff, et al., "Behavioral Interface Specification Language", 2012 ACM; [retrieved on Oct. 18, 2012]; Retrieved from Internet <URL:http://dl.acm.org/citation.cfm?id=2187671>;pp. 16:1-16:48.*

Abrams, et al., "Chitra: Visual Analysis of Parallel and Distributed Programs in the Time, Event, and Frequency Domains", 1992 IEEE; [retrieved on Oct. 18, 2012]; Retrieved from Internet <URL:http://ieeexplore.ieee.org/stamp/stamp.jsp?tp=&arnumber=180623>;pp. 672-685.*

Xu, et al., "Molecule: A Language Construct for Layered Development of Parallel Programs", 1989 IEEE; [retrieved on Oct. 18, 2012]; Retrieved from Internet <URL:http://ieeexplore.ieee.org/stamp/stamp.jsp?tp=&arnumber=24708>;pp. 587-599.*

U.S. Appl. No. 11/931,051, entitled "Global Variable Structure in a Graphical Program", by Rogers, filed Oct. 31, 2007.

* cited by examiner

GLOBAL VARIABLE STRUCTURE IN A GRAPHICAL PROGRAM

FIELD OF THE INVENTION

The present invention relates to the field of graphical programming, and more particularly to a global variable structure in a graphical program.

DESCRIPTION OF THE RELATED ART

In data flow based programs, it is typically very hard for a compiler or development engine to determine which data containers should use the same data memory. Current graphical data flow programming environments do not allow for specification of which variables should use the same memory. Correspondingly, memory utilization may be inefficient, and certain issues may result. For example, an application may not get the necessary performance required (e.g., in a real time controller application). Alternatively, the system may become so large that the controller may run out of memory.

Additionally, while graphical programs currently allow for the use of global containers (or other abstracted variables), structures for modifying or controlling access to them have not been implemented. Correspondingly, improvements in specification of memory use and global variable control are desired.

SUMMARY OF THE INVENTION

Various embodiments are presented of a method for including a global variable structure in a graphical program.

Input including a structure in the graphical program may be received. In various embodiments, the structure may be referred to as a "global variable" structure. The global variable structure may allow for or ensure deterministic modification of values of global variables. For example, the global variable structure may provide a "lock and key" mechanism for modifying values of global variables; thereby preventing other modifications from occurring in that time, which could yield non-deterministic behavior in the graphical program. As used herein, global variables are intended to include any data container which is accessible in an abstract way by a graphical program. For example, a global variable may include a data container which is defined in the graphical program (e.g., without any connections to other nodes) and which is accessible throughout the graphical program.

Global variable structures may be used to modify any data containers which are not directly connected (e.g., in a wired data flow manner) to entities which modify the value of the data container. In other words, global variable structures may be used to modify any variables which may be modified concurrently and independently. Exemplary data containers include I/O channel variables, typical global variables, and/or other independently referenced data containers.

The global variable structure may be included in the graphical program using any of a variety of methods, e.g., including invocation of menus (possibly inside the graphical program or using the development environment's menu system), using a palette (e.g., by dragging the structure from the palette to the graphical program), and/or other methods.

The global variable structure may be displayed in the graphical program, e.g., in response to the input including the structure in the graphical program. For example, where the user selects the global variable structure from a palette and 'drops' the structure in the graphical program, the structure may be displayed as a node or containing structure in the graphical program. The global variable structure may have a shape, color, pattern (e.g., around the edge of the structure), etc. which visually indicates that the structure is a global variable structure which is usable for optimizing memory usage of the graphical program. In one embodiment, the global variable structure may be uniquely characterized by having unique in-set terminals which are typically paired across the width of the global variable structure. These terminals may be referred to as "boundary nodes" of the global variable structure. In one embodiment, movement of one of the boundary nodes may results in corresponding movement of the other boundary nodes (i.e., such that movement of one is locked with movement of the other).

In one embodiment, the global variable structure may be rectangular and/or have an interior portion. The interior portion may be usable to receive one or graphical program nodes. Thus, in one embodiment, the structure may include an interior portion operable to receive nodes (e.g., during configuration of the in-place structure). The nodes may be displayed in the interior portion of the global variable structure in the graphical program. In some embodiments, the interior portion may be collapsible (e.g., where, when collapsed, the interior portion is not displayed). Alternatively, the in-place structure may not include an interior portion, but may be selected in the graphical program and a subdiagram (e.g., as a new window in the development environment) may be displayed. The subdiagram may be configured similar to the interior portion described above.

The structure may be configured. Configuration of the global variable structure may include association of the global variable with the structure, e.g., connecting the global variable (or a node representing the global variable) to the global variable structure, e.g., to a border node or input terminal of the global variable structure. Alternatively, the global variable structure may be connected to a data reference node which provides a data reference value of the global variable to be modified. In some embodiments, the global variable (or a node representing the global variable) may be connected to the data reference node such that the data reference node can extract a data reference from the global variable node.

Configuration of the global variable structure may further include association of at least one graphical program node with the global variable structure. The at least one graphical program node may be executable to modify the value of the global variable. In some embodiments, where the global variable structure includes an interior portion, the at least one node may be placed in the interior portion of the global variable structure. The at least one node may be connected to the border nodes of the global variable structure and/or input and output nodes connected to the global variable structure.

As one example, a data reference value node associated with a global variable may be connected to a border node of the global variable structure. The border node of the global variable structure may be connected to at least one node which in turn may be coupled to a corresponding border node of the global variable structure. The output of the global variable structure may be connected to another data reference node associated with the global variable. Thus, in this embodiment, the data reference value may provide a data reference of the global variable (thereby locking access to the global variable), the border node may use the data reference to retrieve the value of the global variable, the at least one node may execute to modify the value of the global value, the border node may store the value of the global variable in the memory location referenced by the data reference (with minimal copying which may not be necessary), and the data reference value node may then unlock the global value for editing. In one embodiment, to lock and unlock access of the global variable/container, the data reference node may first retrieve and delete the data reference from the global variable and then (after modification) store the new data reference value in the global variable.

In one embodiment, one or more other nodes may be used to retrieve and delete data references, e.g., for use with the global variable structure. For example, in one embodiment, an array may be connected to a node which creates a new data. More specifically, the node may take an input data value and store it in a particular global variable (or storage container) and provide a reference to that global variable. The node may provide the data reference as an output, e.g., for a global variable structure. The global variable structure may then use the data reference as described above. On output, the border node may provide store the modified value in the memory referenced, and provide the data reference to another node which may delete the data reference value and provide the data, e.g., for storage in a new array, following the example from above.

Where the global variable is referenced for modification multiple times in a graphical program, e.g., using one or more global variable structures, the development environment may determine a specific order to modify the global variable structure in order to avoid deadlocks. Alternatively, or additionally, the user may provide priorities or a specified order which the development environment or run time engine which may adhere to.

The graphical program may be executed. The global variable may be modified in a deterministic manner according to the global variable structure(s) of the graphical program.

BRIEF DESCRIPTION OF THE DRAWINGS

A better understanding of the present invention can be obtained when the following detailed description of the preferred embodiment is considered in conjunction with the following drawings, in which.

Figure 1A:
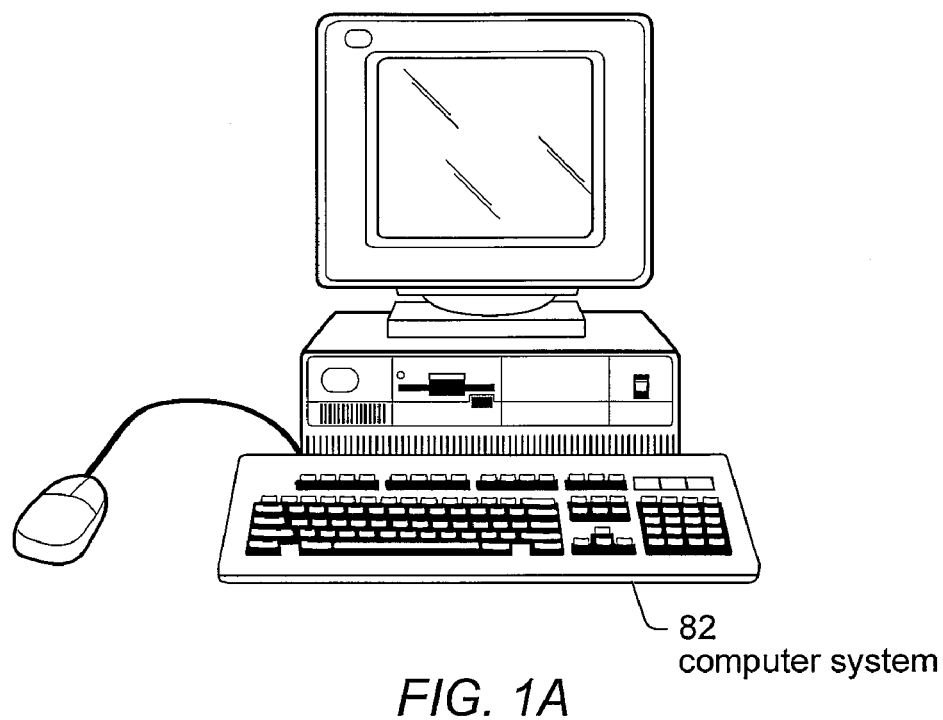
FIG. 1A illustrates a computer system operable to execute a diagram according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

The following references are hereby incorporated by reference in their entirety as though fully and completely set forth herein:

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 6,763,515, titled "System and Method for Automatically Generating a Graphical Program to Perform an Image Processing Algorithm," filed Jun. 5, 2000.

U.S. Patent Application Publication No. 2001/0020291 (Ser. No. 09/745,023) titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program"

includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Diagram—A graphical image displayed on a computer display which visually indicates relationships between graphical elements in the diagram. Diagrams may include configuration diagrams, system diagrams, physical diagrams, and/or graphical programs (among others). In some embodiments, diagrams may be executable to perform specified functionality, e.g., measurement or industrial operations, which is represented by the diagram. Executable diagrams may include graphical programs (described below) where icons connected by wires illustrate functionality of the graphical program. Alternatively, or additionally, the diagram may comprise a system diagram which may indicate functionality and/or connectivity implemented by one or more devices. Various graphical user interfaces (GUIs), e.g., front panels, may be associated with the diagram.

Graphical Program—A program comprising a plurality of interconnected nodes or icons, wherein the plurality of interconnected nodes or icons visually indicate functionality of the program. A graphical program is a type of diagram.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, wherein the connections between the nodes indicate that data produced by one node is used by another node.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes (sub-VIs), terminal nodes, structure nodes, etc. Nodes may be connected together in a graphical program by connection icons or wires. The term "logical element" is used herein to refer to a "node". For example, the term "logical element: may refer to a software program portion or code that is executable by (or implementable on) a processing element, and which is represented iconically on a display. Logical elements include virtual instruments (VIs), primitives, etc. Logical elements may be displayed in various ones of the diagrams described herein, e.g., in graphical programs, system diagrams, etc.

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons. Wires may represent logical data transfer between icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics. Wires may indicate communication of data, timing information, status information, control information, and/or other information between icons. In some embodiments, wires may have different visual appearances which may indicate different characteristics of the wire (e.g., type of data exchange semantics, data transport protocols, data transport mediums, and/or type of information passed between the icons, among others).

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 82 operable to display and/or execute a graphical program. As shown in FIG. 1A, the computer system 82 may include a display device operable to display the diagram as the diagram is created and/or executed. The display device may also be operable to display a graphical user interface or front panel of the graphical program during execution of the graphical program. The graphical user interface may comprise any type of graphical user interface, e.g., depending on the computing platform.

The computer system 82 may include a memory medium (s) on which one or more computer programs or software components according to one embodiment of the present invention may be stored. For example, the memory medium may store one or more graphical programs that are executable to perform the methods described herein. Also, the memory medium may store a development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

Figure 1B:
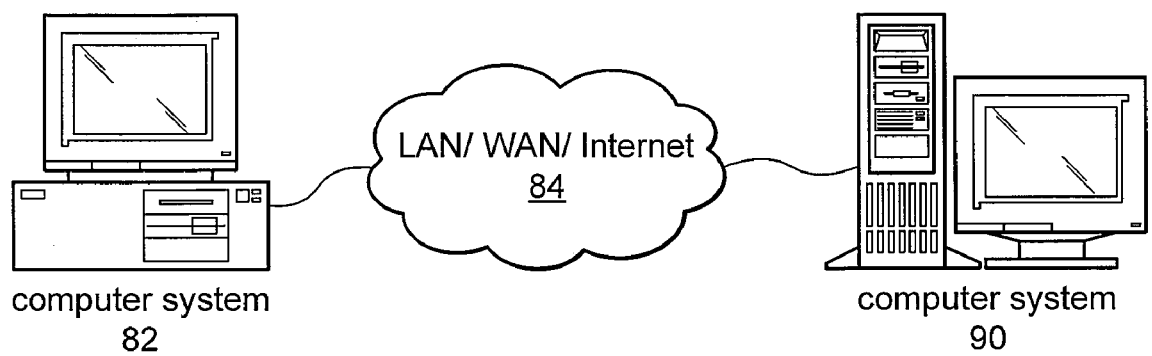
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program. Similar descriptions apply to other executable diagrams.

In one embodiment, a GUI of a diagram may be displayed on a display device of the computer system 82, and while at least a portion of the graphical program executes on device 190 connected to the computer system 82. The device 190 may include a programmable hardware element and/or may include a processor and memory medium which may execute a real time operating system. In one embodiment, the graphical program may be downloaded and executed on the device

190. For example, an application development environment with which the diagram is associated may provide support for downloading a diagram for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
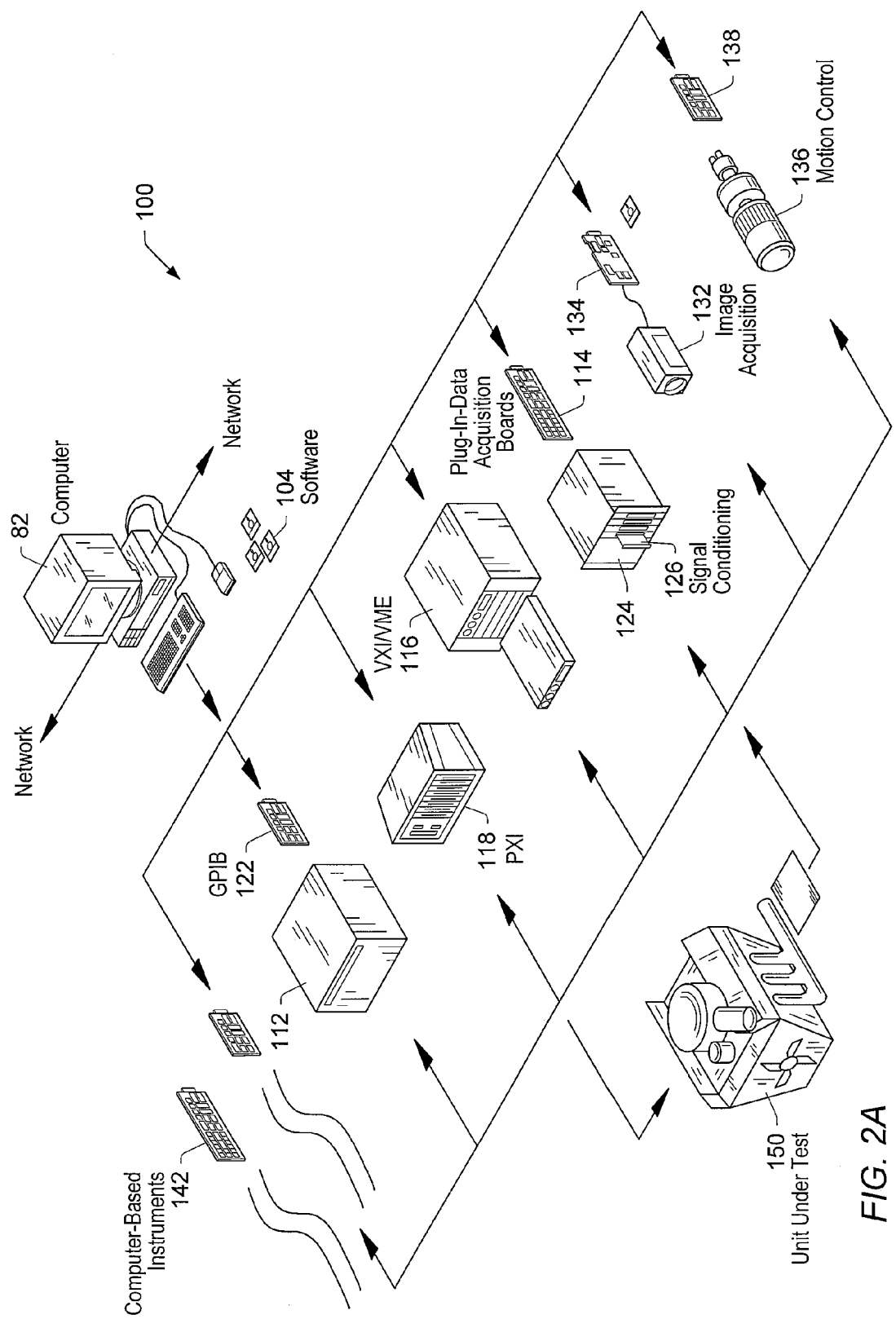
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
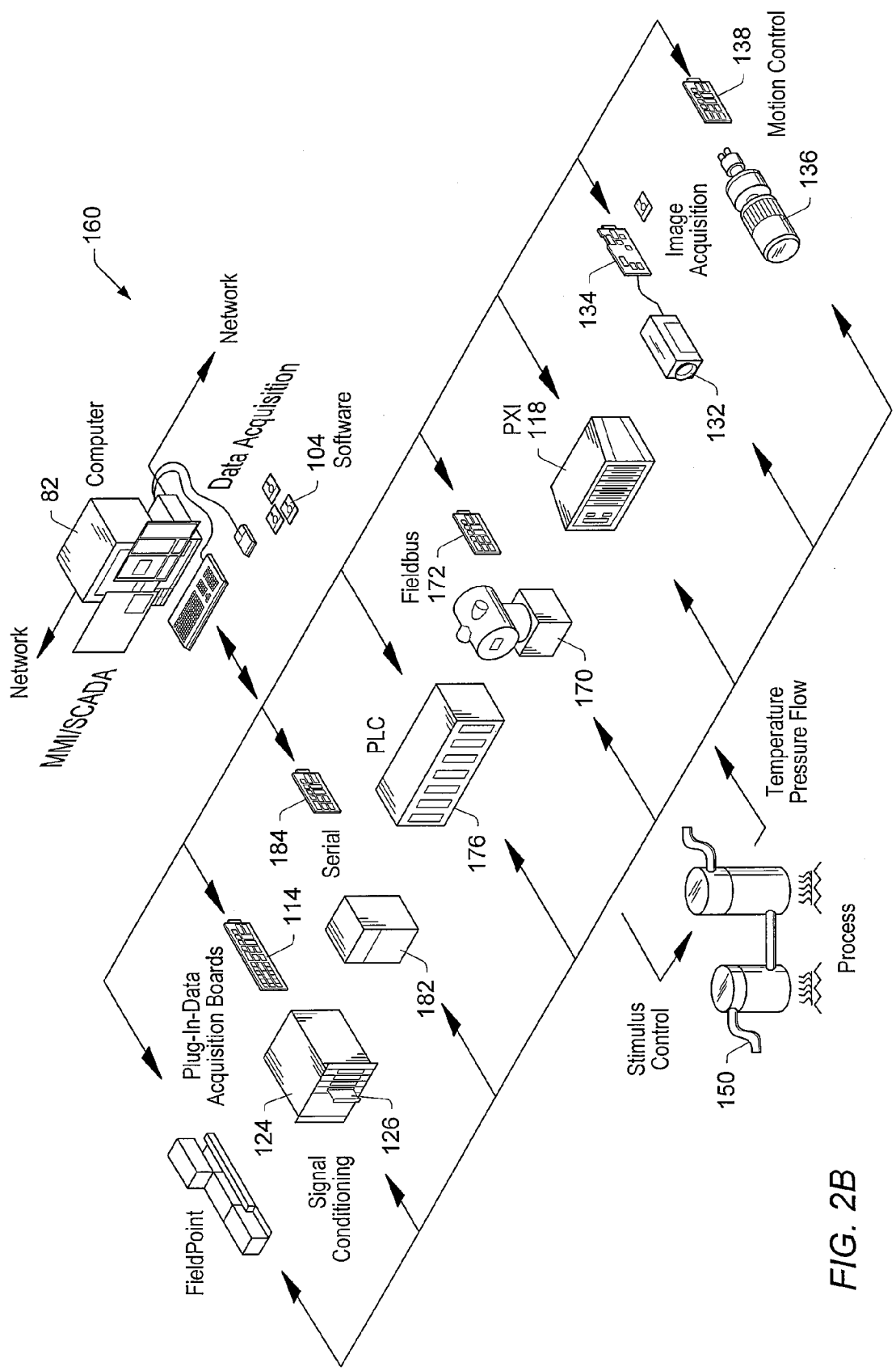
FIG. 2B illustrates an industrial automation system according to one embodiment of the invention.
Figure 3A:
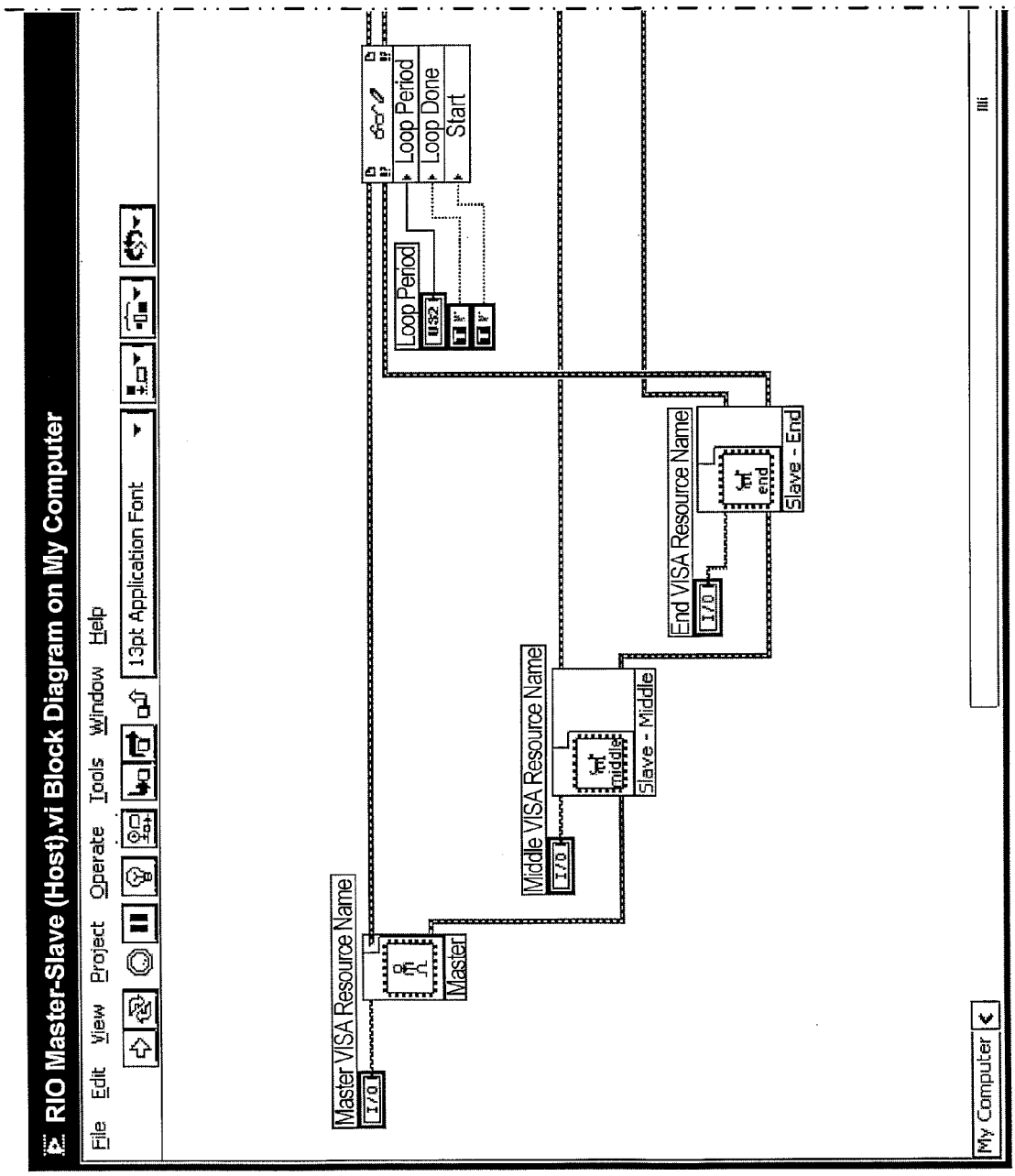
FIGS. 3A-3E are screen shots of an exemplary graphical program according to one embodiment.
Figure 3B:
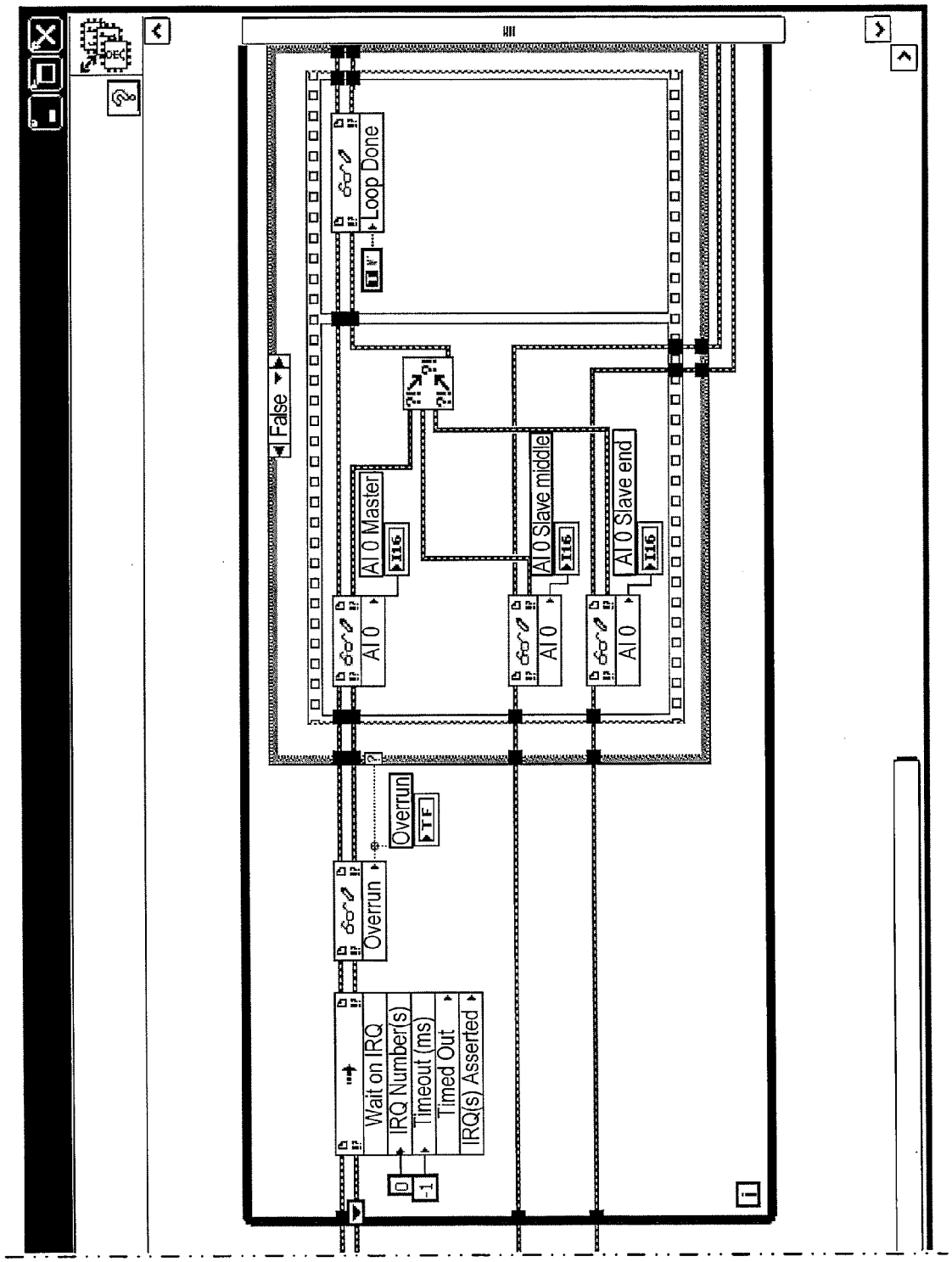
Figure 3C:
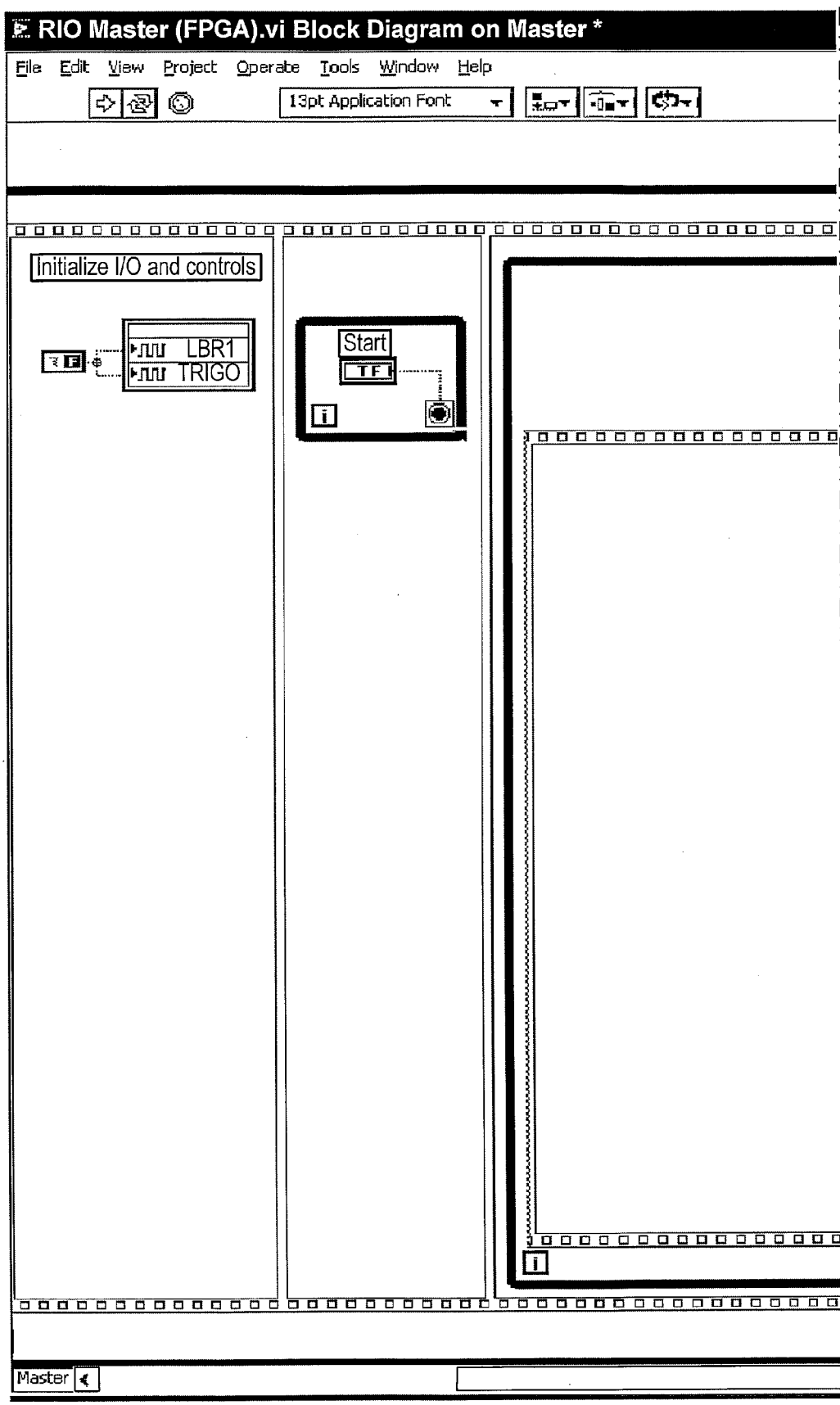
Figure 3D:
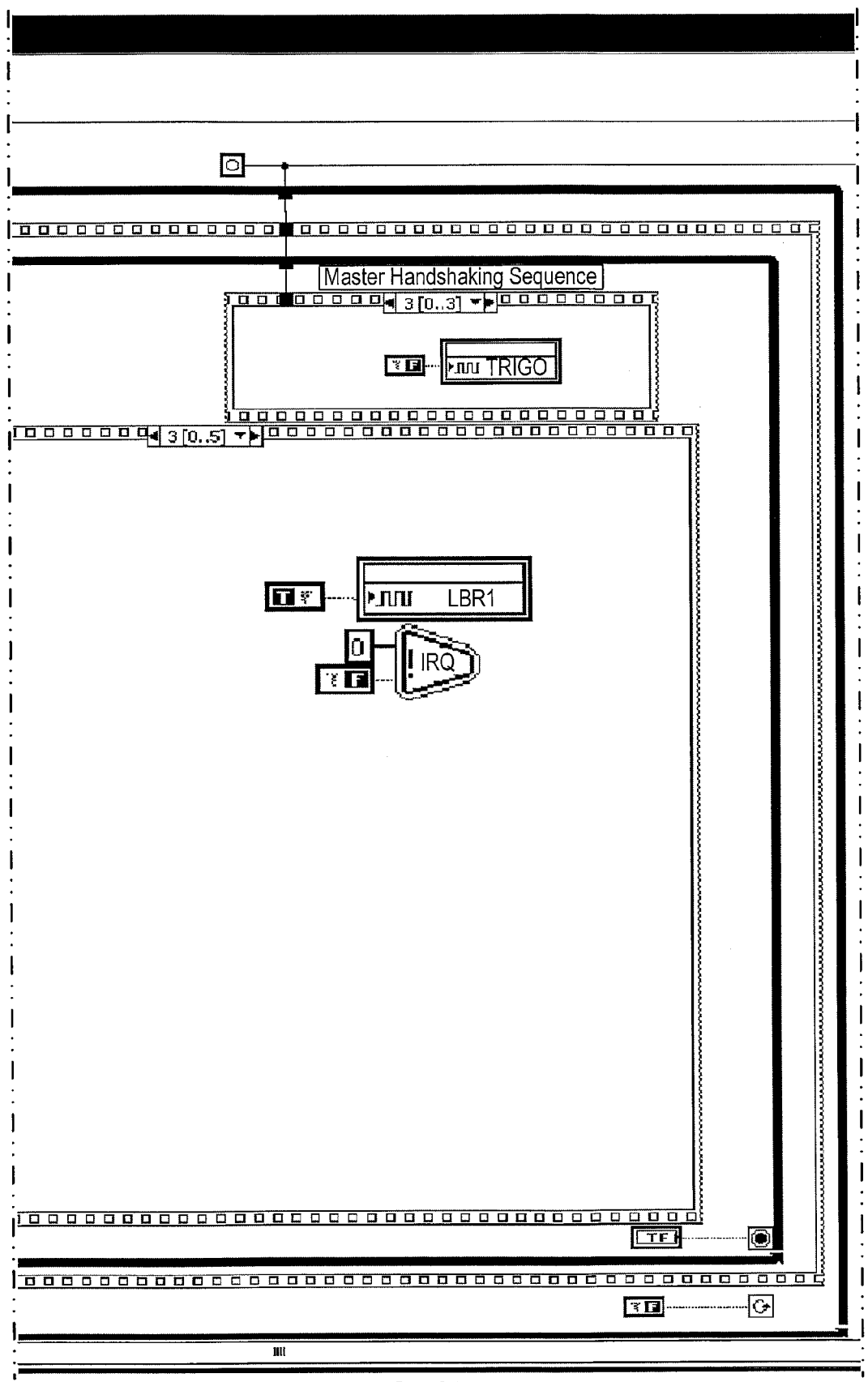
Figure 3E:
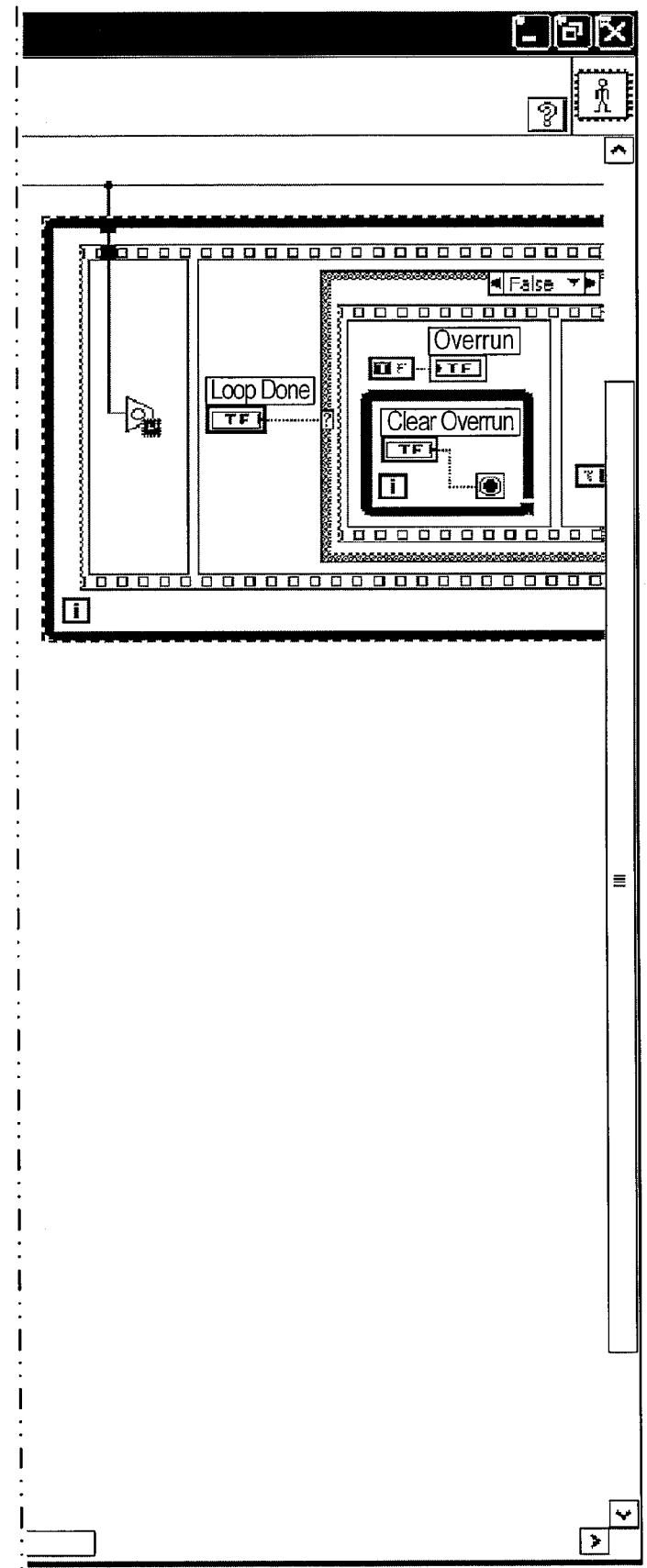

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

In the embodiments of FIGS. 2A and 2B above, one or more of the various devices may couple to each other over a network, such as the Internet. Thus, the user may create a graphical program on a computer and use (execute) the graphical program on that computer or deploy the diagram to a target device (for remote execution on the target device) that is remotely located from the computer and coupled to the computer through a network.

Graphical software programs and/or portions of system diagrams which perform data acquisition, analysis and/or presentation, e.g., for measurement, instrumentation control, industrial automation, modeling, or simulation, such as in the applications shown in FIGS. 2A and 2B, may be referred to as virtual instruments.

FIGS. 3A-3E—Exemplary Graphical Programs

As described above, a graphical program may include a block diagram portion and a graphical user interface portion. In some embodiments, the graphical user interface portion may be comprised within the block diagram portion. The block diagram portion may include a plurality of interconnected nodes or icons which visually indicate functionality of the graphical program. Each of the nodes may have one or more inputs and/or outputs for accepting and/or providing data to other nodes in the graphical program. Each of the nodes in the graphical program may represent software functions or executable code. In other words, the nodes in the graphical program may represent or comprise logical elements (e.g., virtual instruments (VIs), primitives, etc.)

As also indicated above, the nodes in the graphical program may be interconnected by lines or wires which indicate that indicate that data are provided from a first node to a second node in the graphical program. In some embodiments, the wires may be connected to the terminals of nodes in the graphical program. The terminals may provide connection points for connecting the wires to a node, e.g., to individual inputs or outputs of the node. Additionally, as described herein, these wires may be configured (e.g., automatically or manually) to provide data synchronously or asynchronously using various data exchange semantics and/or data transfer mechanisms (among others). In some embodiments, wires which indicate transfer of data may be referred to as data transfer wires.

Note that references to configuration of wires (or similar remarks) actually may refer to the user providing input to the graphical representation of the wire on the display to configure the manner in which data is transferred during execution as represented by the wire. For example, configuration of a wire may actually refer to configuring software (code and/or data) represented by the wire (and/or associated icons). The configured software may then be executable to perform the specified functionality during diagram execution. In other words, during execution data transfer is performed according to the configuration of the wire. Additionally, references to the wire providing or conveying data between icons in the graphical program may actually mean that data is passed between two software entities executing on the same or different devices according to the placement of and/or configuration of the wire. Thus, the wire may indicate (e.g., visually) that data is passed among nodes in a graphical program during execution.

Note that the wires may also be timing wires which may provide timing information (e.g., time stamps) between nodes in the graphical program. Note that in some embodiments, the timing wires may be configurable, e.g., for asynchronous or buffered communication. Such wires may be referred to as buffered timing wires or asynchronous timing wires. For further information regarding timing wires, please see U.S. application Ser. No. 10/893,745, titled Graphically Representing Timing in a Graphical Program, which is hereby incorporated by reference as if set forth herein in its entirety.

In some embodiments, the graphical program may include one or more structure nodes which indicate control flow among one or more nodes in the graphical program. For example, the graphical program may include a conditional structure node (e.g., to implement conditional branching, if statements, switch statements, signal routing, etc.), a looping structure node for implementing looping among one or more nodes (e.g., while loops, do while loops, for loops, etc.), and/or other control flow nodes.

Additionally, the graphical program may visually indicate where portions of the graphical program are executed. In one embodiment, the visual indication may include a rectangular box that contains a portion of graphical code. In some embodiments, this visual indication may be referred to as a target execution node or icon. The target execution node may have an interior portion where graphical program code that is targeted for execution on a device is contained. For example, a device icon that includes an interior portion that is designed to receive graphical program code may be referred to as a target execution node.

The graphical program may be created or assembled by the user arranging on a display (e.g., of the computer system 82) a plurality of nodes or icons and then interconnecting the nodes to create the graphical program. In some embodiments, the user may select icons and/or wires from various palettes shown in a development environment on the display. In response to the user assembling the graphical program, data structures may be created and stored which represent the graphical program. As noted above, the graphical program may comprise a block diagram and may also include a user interface portion or front panel portion. Where the graphical program includes a user interface portion, the user may optionally assemble the user interface on the display. As one example, the user may use the LabVIEW development environment to create the graphical program.

In an alternate embodiment, the graphical program may be created by the user creating or specifying a prototype, followed by automatic creation of the graphical program from the prototype. This functionality is described in U.S. patent application Ser. No. 09/587,682 titled "System and Method for Automatically Generating a Graphical Program to Perform an Image Processing Algorithm", which was incorporated by reference in its entirety above. Further descriptions regarding automatic creation of graphical programs can be found in U.S. Patent Application Publication No. 2001/0020291 which was also incorporated by reference above. Thus, the graphical program may be created in other manners, either manually (by the user) or automatically, as desired. The graphical program may implement a measurement function that is desired to be performed by one or more devices or instruments (e.g., indicated by target execution icons). In other embodiments, the graphical program may implement other types of functions, e.g., control, automation, simulation, and so forth, as desired.

FIGS. 3A-3E illustrate exemplary portions of a graphical program according to one embodiment. As shown, the graphical program includes a plurality of interconnected nodes which visually indicates functionality of the graphical program.

Thus, the plurality of interconnected nodes may visually indicate functionality of the graphical program. In other words, during execution of the graphical program, the functionality represented by the plurality of interconnected nodes may be performed.

Figure 4:
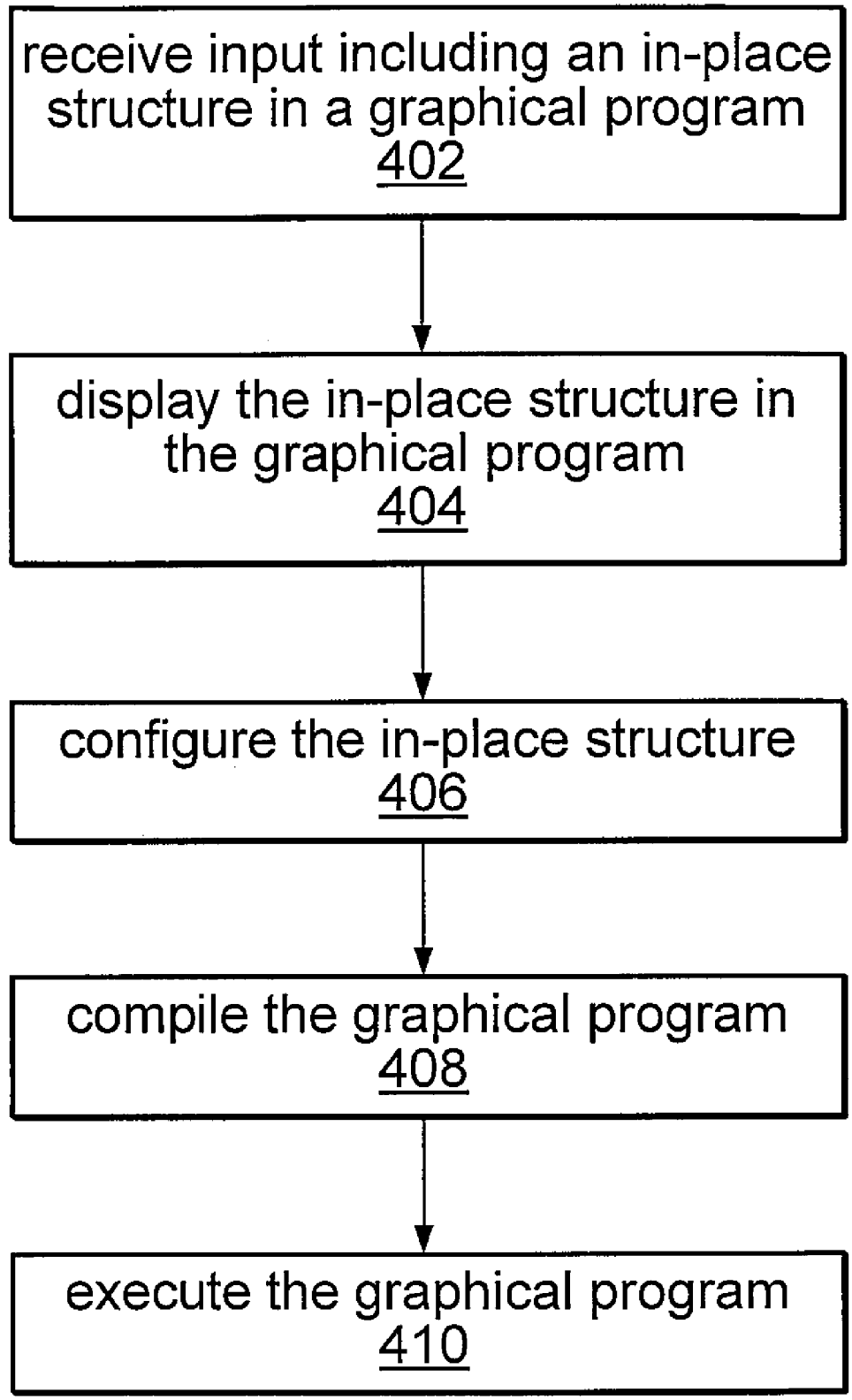
FIG. 4 is a flowchart diagram illustrating one embodiment of a method for including an in-place structure in a graphical program according to one embodiment.

FIG. 4—Method for Including an In-Place Structure in a Graphical Program

FIG. 4 illustrates a computer-implemented method for specifying a graphical program. More specifically, FIG. 4 illustrates a method for including an in-place structure in a graphical program. As indicated above, the graphical program may include a plurality of interconnected nodes which visually represent the graphical program. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, input including a structure in the graphical program may be received. In various embodiments, the structure may be referred to as an "in-place" structure. The in-place structure may indicate that data memory of a first element of the graphical program is usable as data memory for a second element of the graphical program. In other words, the in-place structure may allow a user to graphically indicate how the compiler or run-time engine can attempt to reduce (or optimize) memory use for the graphical program.

In one embodiment, a user may include the in-place structure in the graphical program by selecting the in-place structure from a palette of structures or nodes, e.g., displayed in the graphical programming development environment. For example, the user may select the in-place structure in the palette and drag the in-place structure into the graphical program. Alternatively, or additionally, the user may simply select a portion of the graphical program and choose an option for including the in-place structure (e.g., from a menu, possibly invoked from a right-click mouse gesture or selected from a menu of the development environment).

In 404, the structure may be displayed in the graphical program, e.g., in response to the input including the structure in the graphical program. For example, where the user selects the in-place structure from a palette and 'drops' the structure in the graphical program, the structure may be displayed as a node or containing structure in the graphical program. The in-place structure may have a shape, color, pattern (e.g., around the edge of the structure), etc. which visually indicates that the structure is an in-place structure which is usable for optimizing memory usage of the graphical program. In one embodiment, the in-place structure may be uniquely characterized by having in-set terminals which are typically paired across the width of the in-place structure. These terminals may be referred to as "boundary nodes" of the in-place structure. In one embodiment, movement of one of the boundary nodes may results in corresponding movement of the corresponding boundary node (i.e., such that movement of one is locked with movement of the other).

In one embodiment, the in-place structure may be rectangular and/or have an interior portion. The interior portion may be usable to receive one or graphical program nodes. Thus, in one embodiment, the structure may include an interior portion operable to receive nodes (e.g., during configuration of the in-place structure). The nodes may be displayed in the interior portion of the in-place structure in the graphical program. In some embodiments, the interior portion may be collapsible (e.g., where, when collapsed, the interior portion is not displayed). Alternatively, the in-place structure may not include an interior portion, but may be selected in the graphical program and a subdiagram (e.g., as a new window in the development environment) may be displayed. The subdiagram may be configured similar to the interior portion described above.

In 406, the structure may be configured. In one embodiment, the user may invoke configuration of the structure using a menu (or configuration wizard). For example, the configuration menu may allow the user to select specific types of border nodes which may allow the in-place structure to interact with different types of data containers of the graphical program (examples are provided below). Additionally, in one embodiment, at least one graphical program node may be associated with the in-place structure. The at least one graphical program node may be executable to modify the first element to produce the second element.

As one example, a graphical node containing data or representing data may be connected the in-place structure in the graphical program, e.g., to an input terminal of the in-place structure. Another graphical node for containing data or representing data may be connected to the in-place structure in the graphical program, e.g., from an output terminal of the in-place structure. The at least one graphical program node may be associated with the in-place structure by being placed inside the in-place structure and connected to the input and output terminals of the in-place structure. In some embodiments, the at least one graphical program node may be a plurality of graphical program nodes which operate to manipulate the value of the first element and the second element (which may be respective portions of the graphical container nodes connected to the in-place structure node). However, it should be noted that in one embodiment, a first element and a second element may be "in-place" (as indicated by the in-place structure), but may not be directly connected via wires.

In one embodiment, the in-place structure may be used to modify a single element (or one or more elements) of an array (e.g., using a particular set of border nodes, as described above). For example, a user may connect a first array to the in-place structure as an input with one or more values as other inputs (e.g., corresponding to each element of the array which will be manipulated). In a simple case, where one element of the array is to be manipulated, the input terminal of the in-place structure may be wired to one or more graphical program nodes in the interior of the in-place structure (or one or more program nodes otherwise associated with the in-place structure). These nodes may be executable to modify the value of the element of the array. The one or more nodes may be connected to the output terminal of the in-place structure, which in turn may be connected to another array in the graphical program.

In various embodiments, where more than one element of the array is used, the respective elements may be wired directly across to the corresponding element positions of the output array (where original array element [1] is used as output array element [1]). However, the in-place structure may also allow for increased memory utilization when elements are not wired directly across (e.g., where original array elements [1] and [3] are used as output array elements [3] and [1], respectively). Various swapping and sorting algorithms may be used to modify the output array without copying the old array and generating a new array.

Thus, in this example, the first array (or the one or more elements of the array) may correspond to the first element of the graphical program and the second array (or the one or more elements of the second array) may correspond to the second element of the graphical program. Thus, the in-place structure indicates that the data memory of the first array and the second array can be the same, e.g., during modification of the element of the first array. More specifically, this structure may indicate that the particular element being extracted and modified may be directly modified during manipulation (i.e., by the at least one node associated with the in-place structure). Additionally, the data memory of the first array may not be duplicated (since the data of the element being manipulated is modified "in-place").

However, it should be noted that, in some embodiments, some portions of the array or the element may be copied for modification. For example, while the entirety of the first array may not be copied, some portion of the element may be copied during manipulation. In some embodiments, the development environment (or compilation/run time environment) may analyze the in-place structure to determine the minimal amount of copying/memory that can be used to perform the modification as specified in the in-place structure. In other words, the in-place structure indicates to the compiler/development environment that the first array and the second array can use the same memory, and that, in particular, the element(s) being modified do not have to be duplicated or maintained during modification. In response, the compiler uses this indication (as designated by the presence of the in-place structure) to minimize memory usage. In one embodiment, the array is not duplicated. In one embodiment, the element is not duplicated. In some embodiments, portions of the array and/or the element are duplicated, but are done so as minimally as possible. Correspondingly, proper use of the in-place structure results in a decrease in memory allocation for the graphical program.

Note that the descriptions above are not limited to arrays and may apply to any of a variety of operations of elements of a graphical program, such as those described herein, among others. The following paragraphs provide more examples. Additionally, descriptions regarding exemplary screen shots of the in-place structure (in the following Figures) are described below.

In one embodiment, the in-place structure may be similarly used to modify one or more elements of a cluster. A cluster is a container which stores one or more data values which may have one or more different data types. For example, a cluster of a person may include a Name (string), Birthday.Day (integer), Age (integer), etc. In this example, the in-place structure may be used to extract and modify one or more of these elements of the cluster in a similar fashion to the elements of the array described above.

Additionally, the in-place structure may be used to modify one or more elements of a waveform. Typically, waveforms are similar to cluster, in that they may include named elements that can be unbundled and modified. Correspondingly, the in-place structure may be used to modify individual elements (or groups thereof) without duplicating the memory of the elements and/or the waveform.

In one embodiment, the in-place structure may be used to operate on variants. A variant can be of any data type (or alternatively, is a data type that can store or represent any data of any type), similar to a void* in C. The in-place structure can be used to extract the data from the variant according to a data type. For example, the input terminal of the in-place structure (e.g., for variants) may accept the variant as well as another data type or value of a data type. The in-place structure, on execution, compilation, or edit time, may attempt to extract data from the variant according to the connected data type. If the data type of the data of the variant matches that data type, the in-place structure may modify the variant data according to the at least one node associated with the in-place structure. Alternatively, the variant data does not match the provided data type, no action may be performed or a default value may be used (e.g., as specified by the data container providing the expected data type). Thus, the in-place structure may be used to extract and modify data of a variant without fully duplicating the data.

Additionally, the in-place structure may be used to indicate that two storage containers can use the same memory. For example, if two strings are connected to the in-place structure and concatenated (e.g., inside the in-place structure by the at least one node), the in-place structure may be used to indicate that the resulting string (also connected to the in-place structure) can use the same memory as one of the strings coming into the in-place structure (e.g., as indicated by the appearance of the in-place structure and/or terminals of the in-place structure). This may be especially useful when different diagrams and sub-diagrams call each other. For example, a calling diagram (or VI) may be notified that two terminals are "In Place" using this structure. In general, this technique may be used to move a copy from a containing diagram to a subdiagram. Also, as indicated above, this structure may indicate that minimal copying should be used with respect to the two indicated elements.

The in-place structure may also be used to split and rejoin portions of an array (e.g., similar to using one or more elements of the array), such that the array may be split into array subsets or subarrays for further manipulation. These subarrays may then be rejoined to an array connected to the output of the in-place structure. Additionally, the in-place structure may be used to get and set variant attributes. Note that while numerous examples of uses of the in-place structure have been provided above, further uses and examples are envisioned. Additionally, a plurality of the uses described above may be used in the same in-place structure, as desired.

Note that the structure may be included in the graphical program with a default configuration, or an automatically configured specification before configuration in 406. In one embodiment, a user may specify a default configuration for in-place structures in the graphical program based on settings, e.g., on one or more different levels, such as project level, development environment level, or diagram level, among others. Alternatively, or additionally, the development environment may analyze nodes in the graphical program (e.g., nodes which are near to the included structure, nodes which have available outputs for connection to the included structure, etc.) to determine what configuration may be desired by the user. Thus, in one embodiment, the development environment may automatically configure the structure when it is included in the graphical program. Correspondingly, the user may or may not need to configure the in-place structure manually as described in 406, and instead, such configuration may be performed automatically. However, after automatic configuration, the user may desired to change the configuration or provide a new configuration, and the details provided above may apply.

In 408, the graphical program may be compiled (e.g., where the development environment is used to compile the graphical program). During compilation, the development environment (or other compiling engine) may examine the connections to the in-place structure, and use the in-place structure to minimize memory usage of the data containers associated with the in-place structure. As indicated above, where properly used, the compiler will decrease memory usage during modification of the data containers associated with the in-place structure. In some cases, the compiler may still need to copy portions (e.g., handles) of the data containers, but will be able to minimize memory use (e.g., by avoiding "deep" copies or, in some cases, any copies, of elements or their data containers) since the in-place structure indicates that data memory of a first element may be used as the data memory for a second element.

In some embodiments, compilation may not be necessary, and the graphical program may be executed in an interpreted or other uncompiled manner. Correspondingly, the methods described above regarding compilation may occur during run-time and/or edit-time as desired.

In 410, the compiled graphical program (i.e., the executable instructions produced in 406), may be executed. During execution, the graphical program may operate in a more memory efficient manner, as stipulated by the in-place structure.

FIGS. 5A-11B—Exemplary Screen Shots of the In-Place Structure

FIGS. 5A-11B are exemplary screen shots which illustrate embodiments of the in-place structure in a graphical program.

Figure 5A:
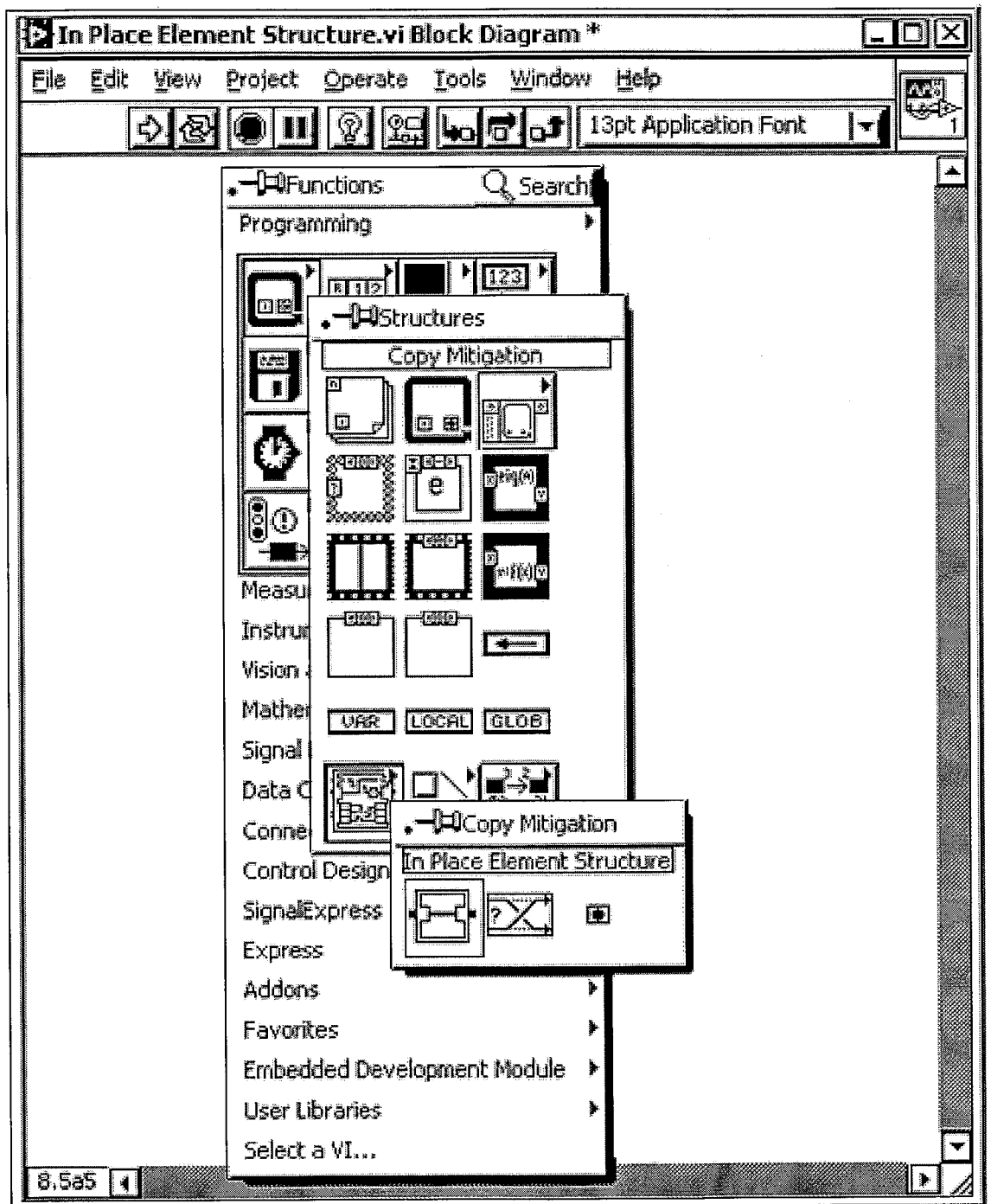
FIGS. 5A-11B are screen shots of exemplary in-place structures and graphical programs.
Figure 5B:
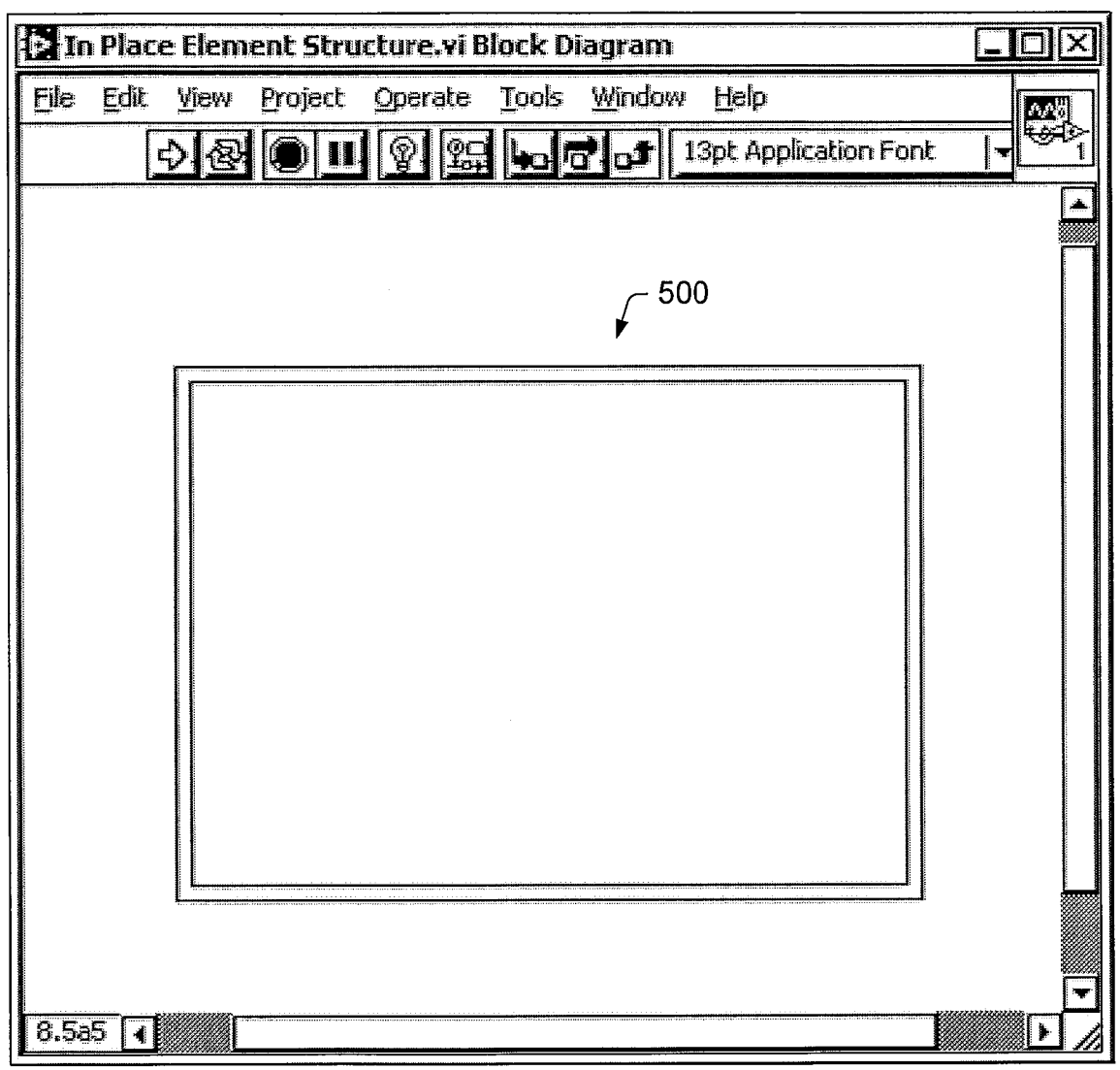

More specifically, FIG. 5A illustrates an empty graphical program where the user has invoked a series of graphical interface windows to select an "In Place Element Structure" option. Correspondingly, FIG. 5B illustrates the resulting graphical structure (in this case, a rectangle with a yellow border). Thus, FIG. 5A illustrates a user including an in-place structure, and FIG. 5B illustrates the resulting displayed (and unconfigured) in-place structure 500.

Figure 6A:
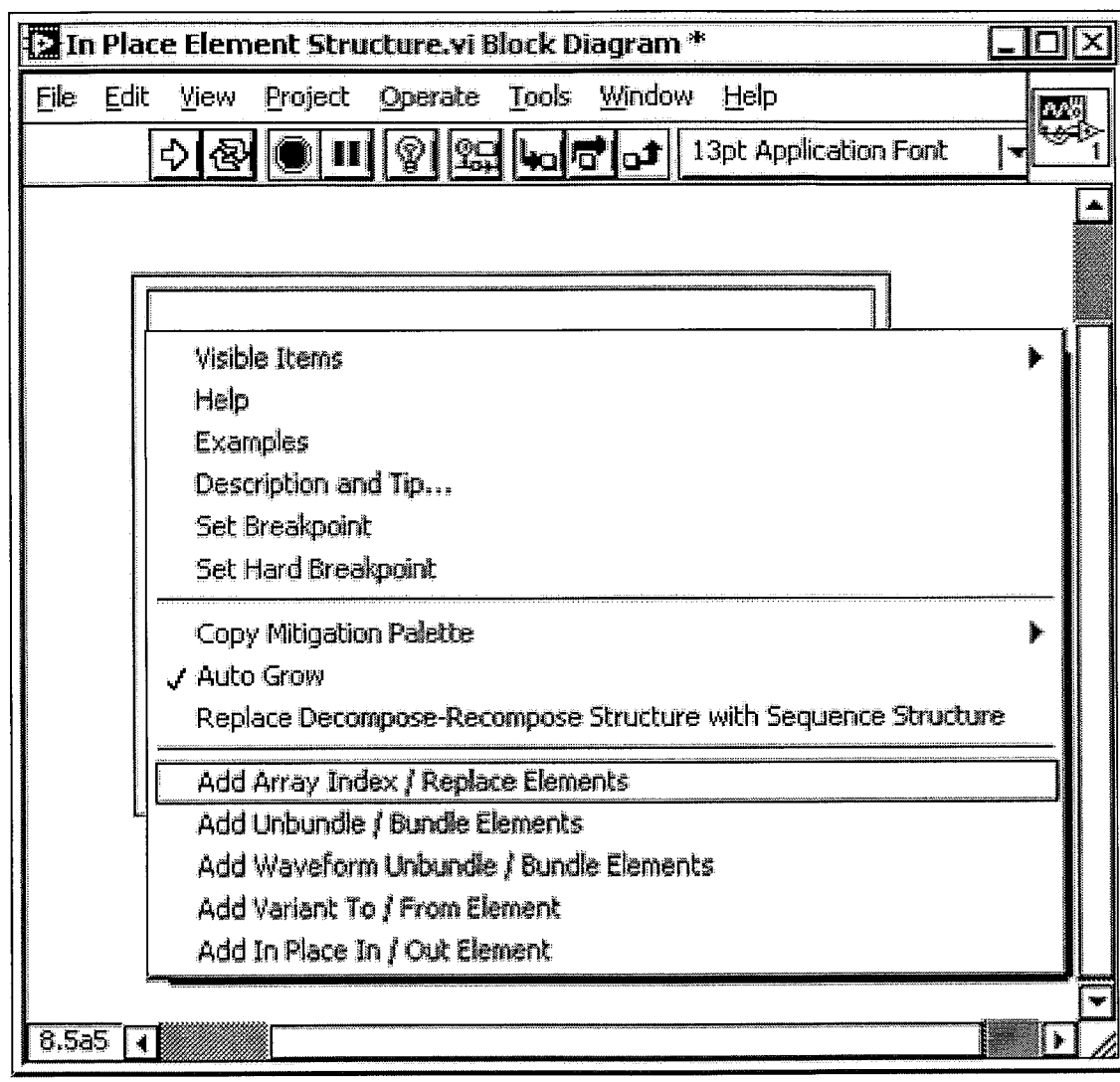

FIG. 6A illustrates a user invoking a menu to configure the in-place structure. As shown, the user may select from a "copy mitigation palette" (a palette that corresponds to the in-place structure), an "Auto Grow" option (which allows the structure to expand or shrink dynamically), a "Replace Decompose-Recompose Structure with Sequence Structure" (for replacing the in-place structure with another structure), an "Add Array Index/Replace Elements" (which is selected for FIG. 6B), an "Add Unbundle/Bundle Elements", an "Add Waveform Unbundle/Bundle Elements", an "Add Variant To/From Element", and an "Add In Place In/Out Element".

Figure 6B:
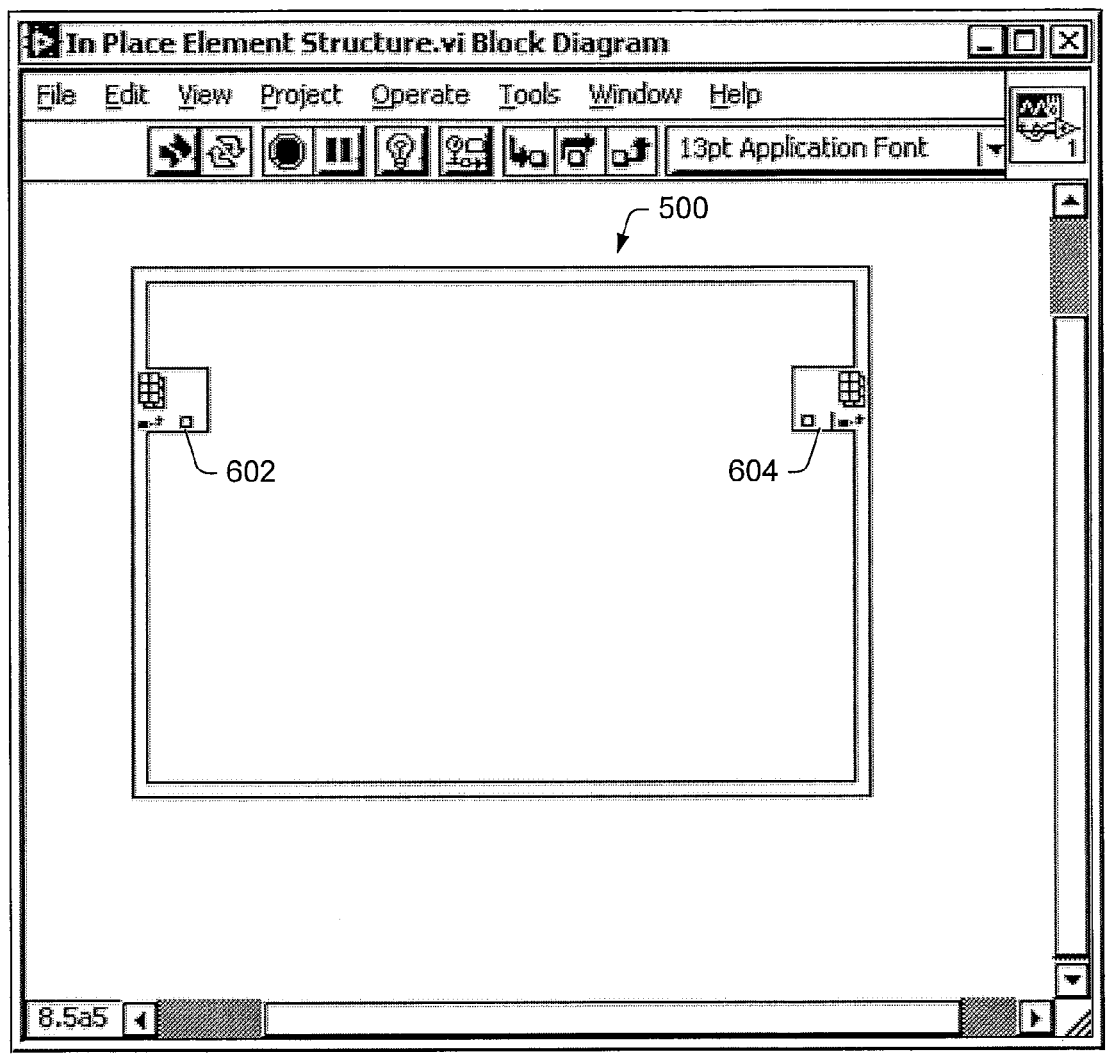

FIG. 6B illustrates the resulting in-place structure 500 after the user has selected the "Add Array Index/Replace Elements" option. As shown, the in-place structure now includes two border nodes on the upper left and upper right hand sides of the in-place structure (602 and 604 respectively).

Figure 6C:
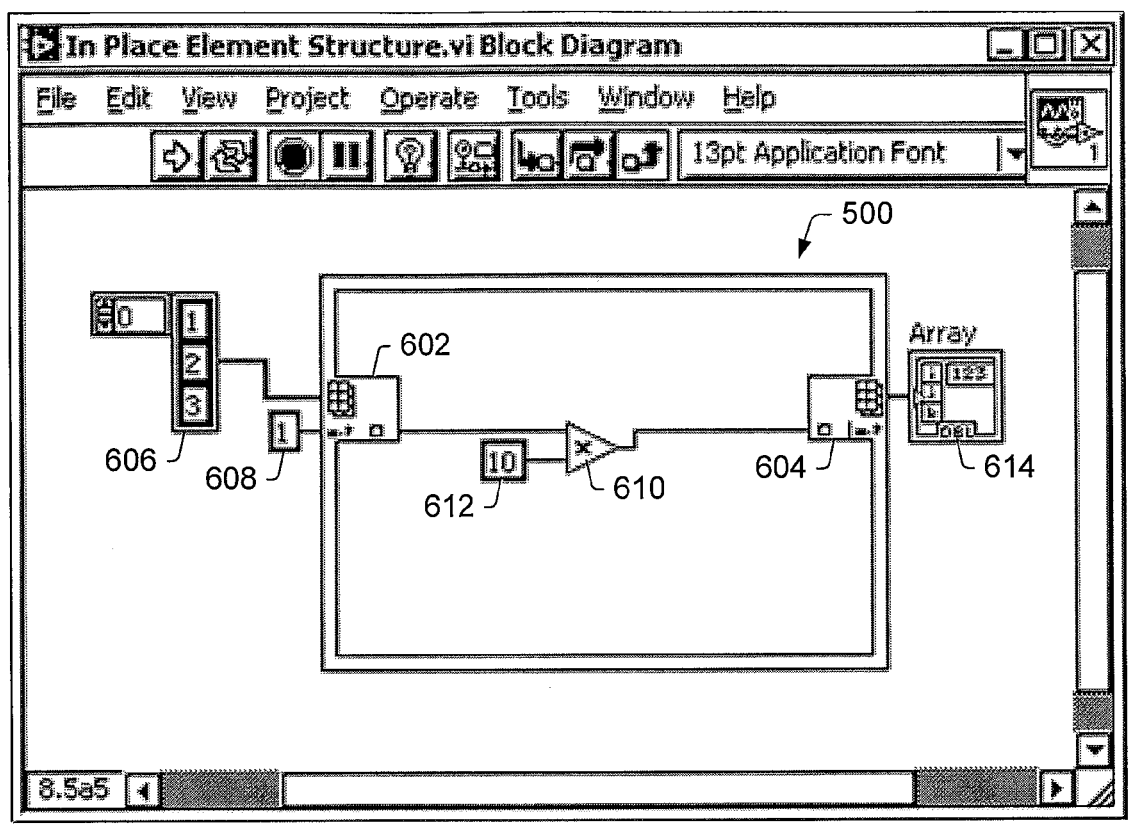
Figure 6D:
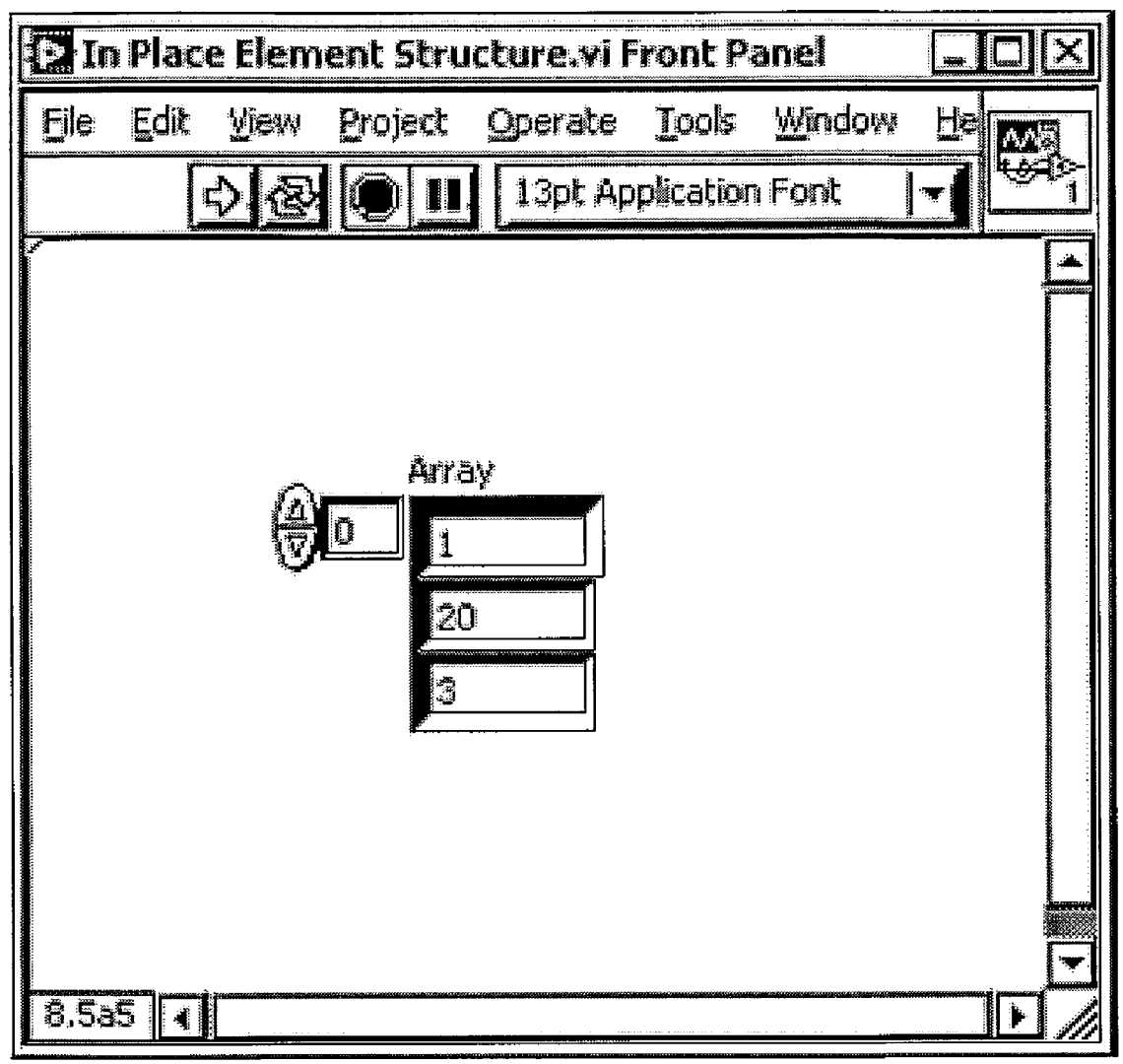

FIG. 6C illustrates a fully configured in-place structure corresponding to those described above. As shown, an array has been created using the constants "1, 2, 3" and is connected to the border node 602, as shown in 606. A constant 608, with value 1, is also connected to the border node 602 to specify the particular element that is modified. In this case, the element of the array with index 1 (which equals 2 before modification) is provided to multiply node 610 which is connected to constant 612 (with value 10) and the border node 604. Finally, output array 614 is connected to border node 604, and represents the output array of the in-place structure. In this case, the output array contains the values 1, 20, 3, as shown in the exemplary front panel of FIG. 6D.

Thus, FIGS. 6A-6D an exemplary in-place structure which extracts and modifies a single element of an array. In this example, the output array uses the same data memory as the input array, and all modifications to the single element (index 1) are performed "in-place" (that is, using the same memory, with minimal or no data duplication).

Figure 7A:
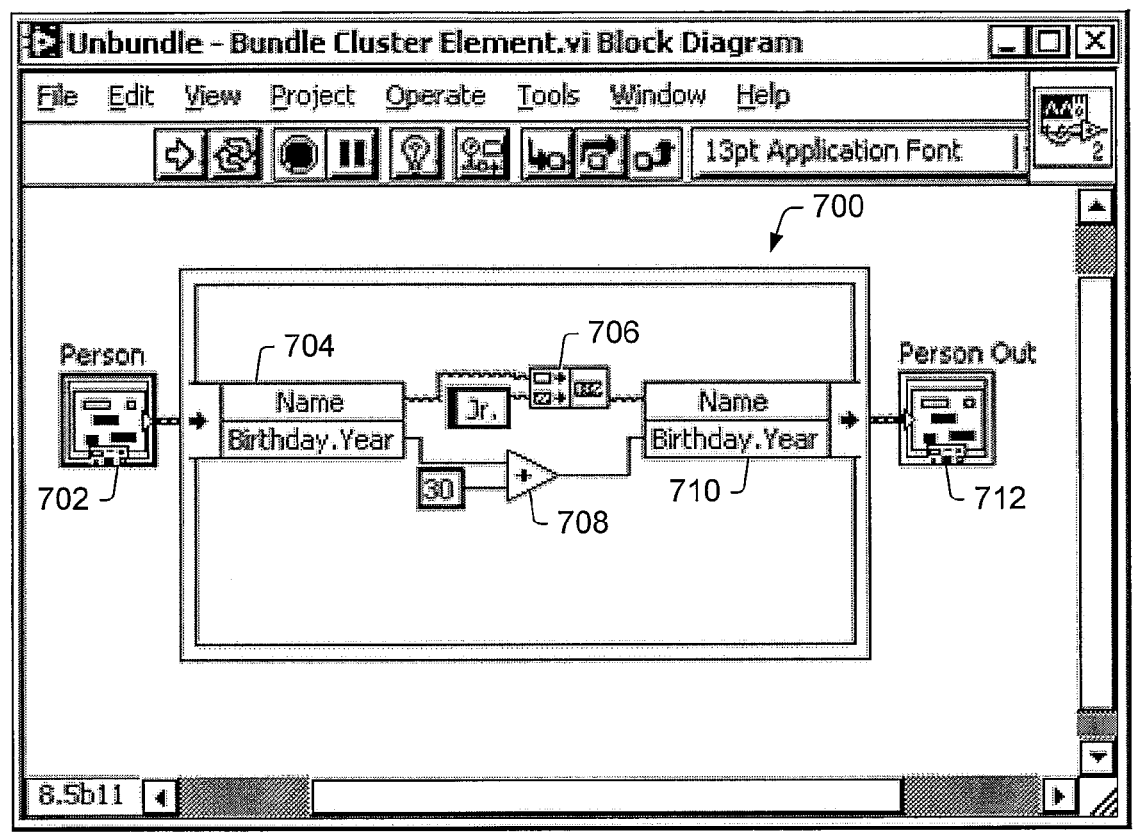
Figure 7B:
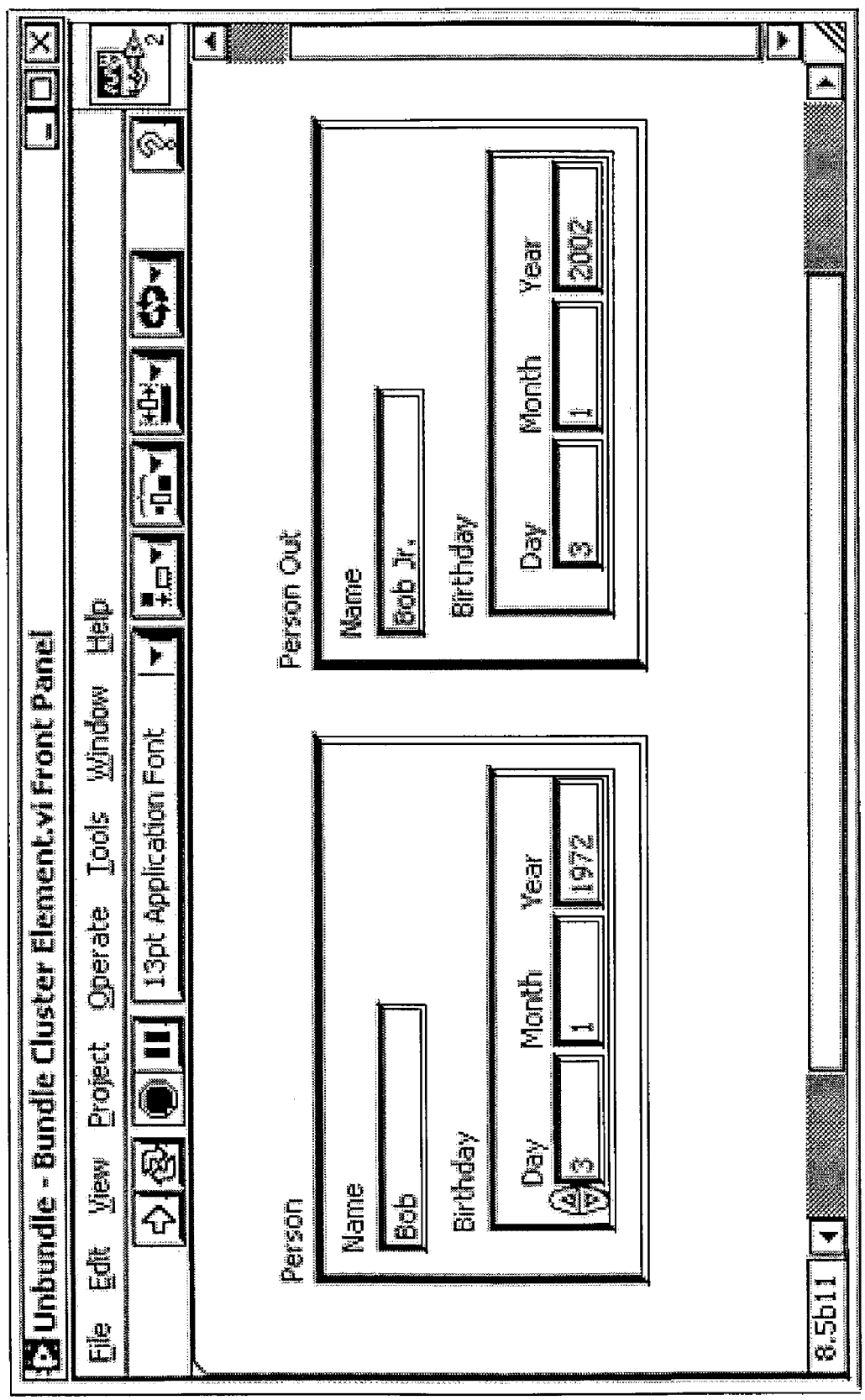

FIG. 7A illustrates a fully configured in-place structure 700 for a first cluster. The in-place structure 700 may have been created similar to the methods described above, e.g., FIGS. 6A and 6B (except with the "Add Unbundle/Bundle Elements" option). In this case, cluster 702 ("Person") is unbundled to elements "Name" and "Birthday.Year" using border node 704. As shown, the "Name" element is concatenated with "Jr." using concatenation node 706 and Birthday.Year is increased by 30 using add node 708. These values are provided to border node 710 which is connected to Person Out 712. As shown in FIG. 7B, the person's original information is "Bob" who was born on Jan. 3, 1972, after execution, the information changes to "Bob Jr." who was born on Jan. 3, 2002.

Figure 7C:
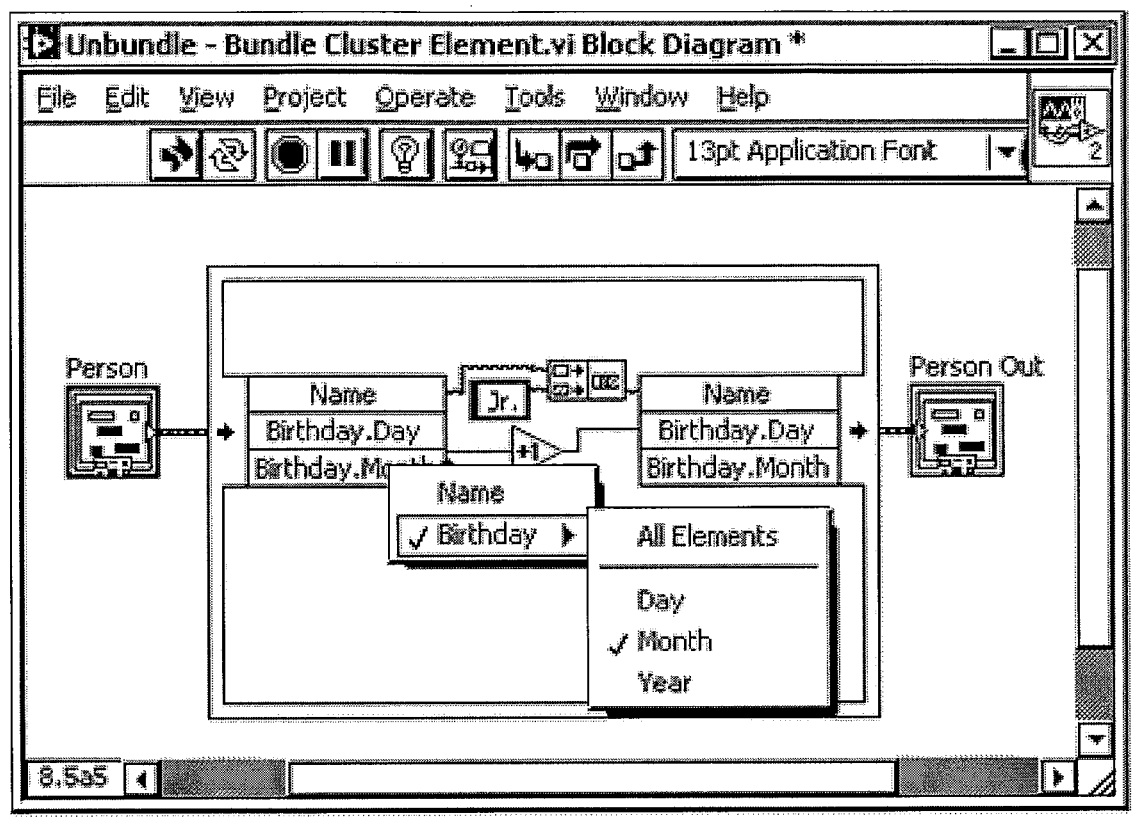

FIG. 7C illustrates the in-place structure of 7A, except that it further includes the cluster element "Birthday.Month". Thus, FIGS. 7A-7C illustrate an exemplary in-place structure which modifies element of a cluster.

Figure 8:
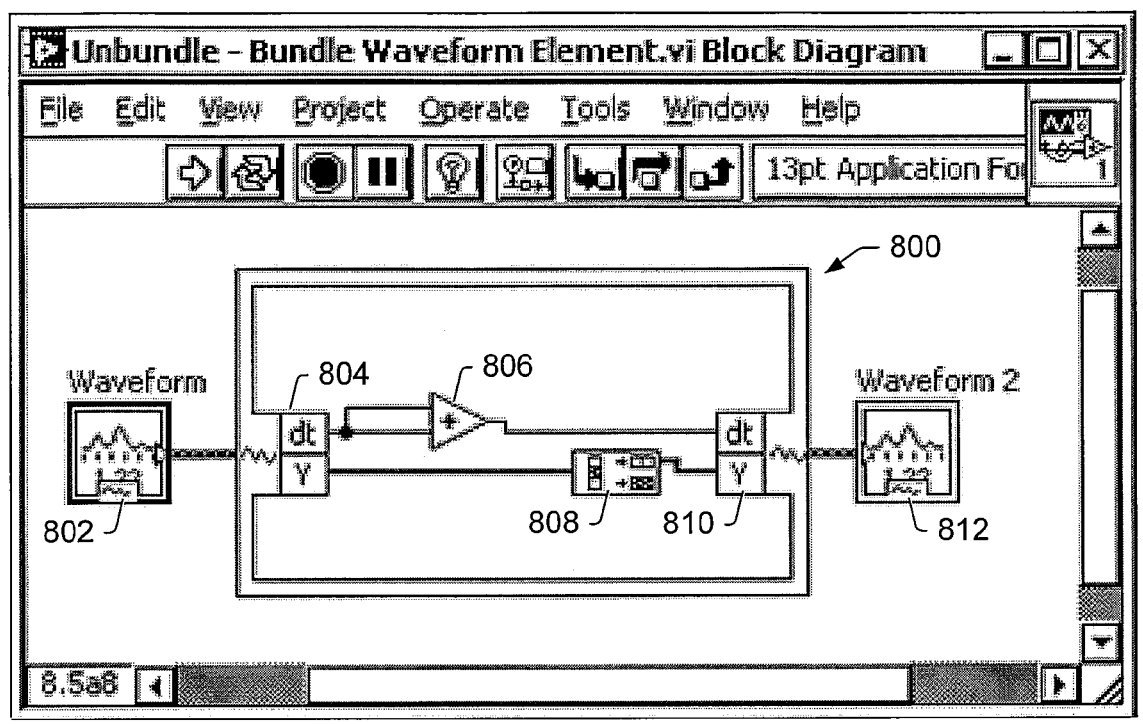

FIG. 8 illustrates an exemplary in-place structure which unbundles and modifies elements of a waveform. As shown, the in-place structure 800 is connected to waveform 802 via border node 804 which unbundles "dt" and "Y" from the waveform 802. The "dt" element is modified by being added to itself (via add node 806) and is provided to border node 810. The "Y" element is modified by node 808, which removes all elements from the Y array. Waveform 2 812 is connected to the output of the in-place structure 800.

Figure 9:
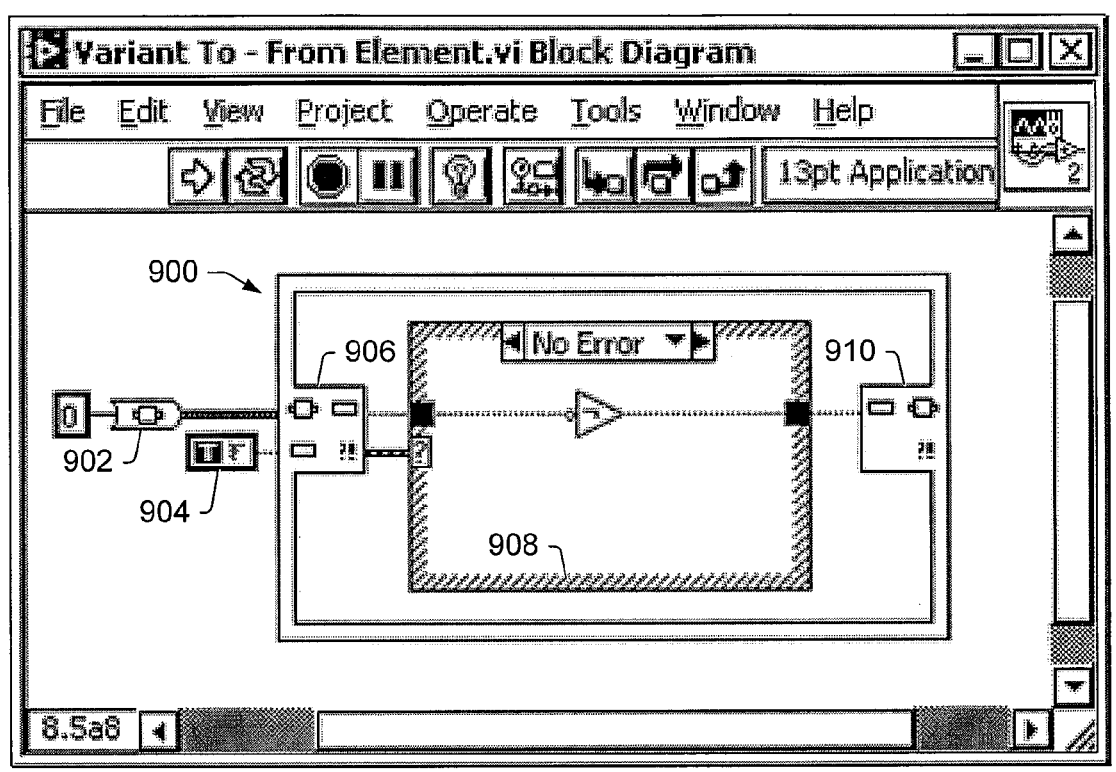

FIG. 9 illustrates an exemplary in-place structure 900 which operates to extract and modify data of a variant. In this example, a variant 902 (with value "0") and a "True" Boolean is connected to border node 906. In this case, the "True" Boolean 904 provides the in-place structure 900 with a data type to attempt to extract (which, in this case, will not occur). The border node 906 is connected to case structure 908 which negates the data extracted from the variant if no error occurs. As shown, the case structure 908 is also connected to border node 910 via its output. In this case, the variant will not be extracted (as it is of the wrong data type) and the value "True" will be used and an error value will be provided from the in-place structure 900 (e.g., via the border node 906 and/or the border node 910, as desired).

Figure 10:
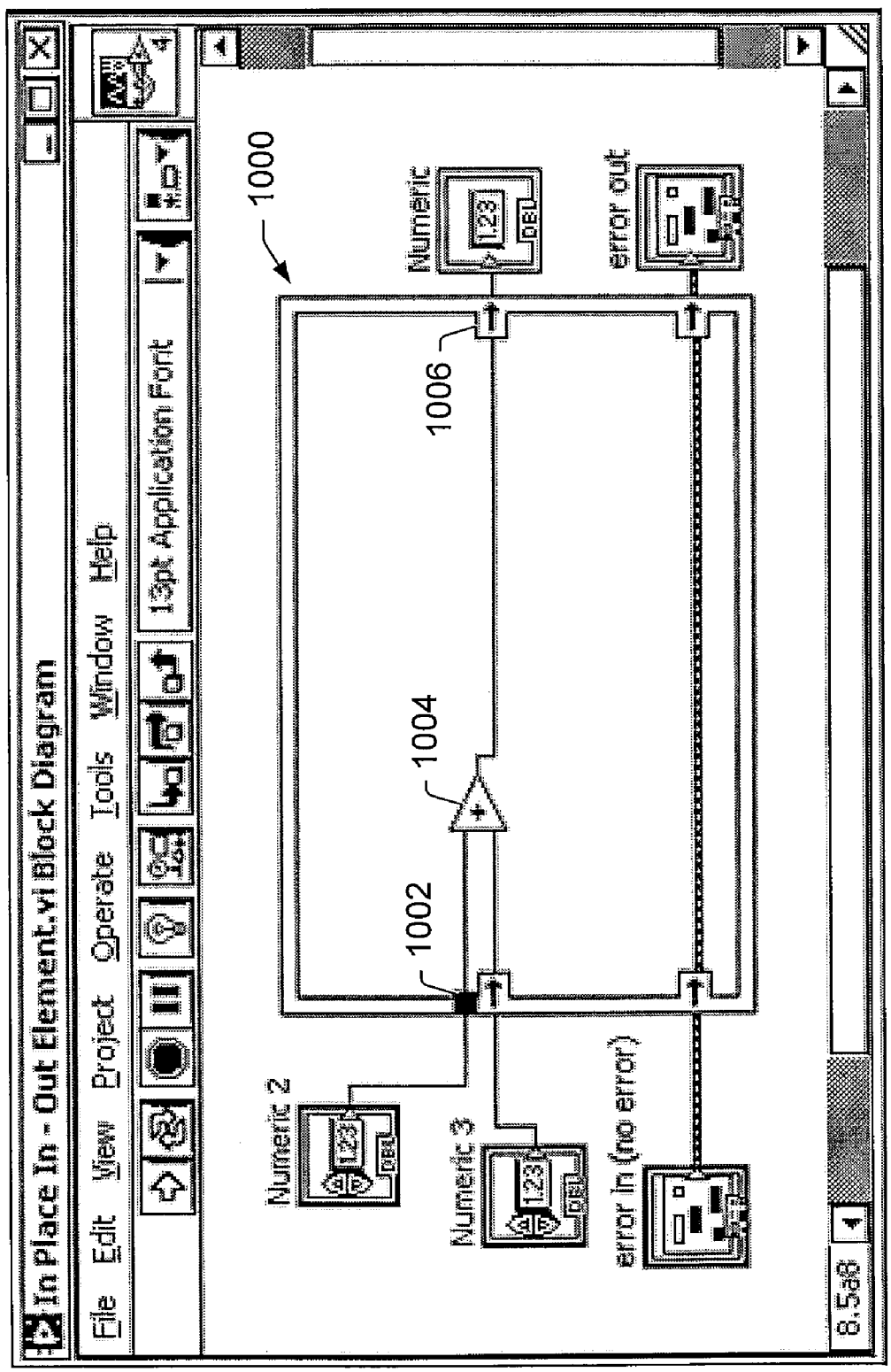

FIG. 10 illustrates an exemplary in-place structure 1000 which indicates that input and output elements can use the same memory. As shown, numeric 2 and numeric 3 are connected to the in-place structure (at border node 1002) and added via add node 1004. The output of add node 1004 is provided to numeric via border node 1006. As shown, the border node 1002 and 1006 include arrows which indicate that numeric 3 and numeric can use the same data memory. As also shown, error in and error out are connected via the in-place structure, indicating that they use the same memory.

Figure 11A:
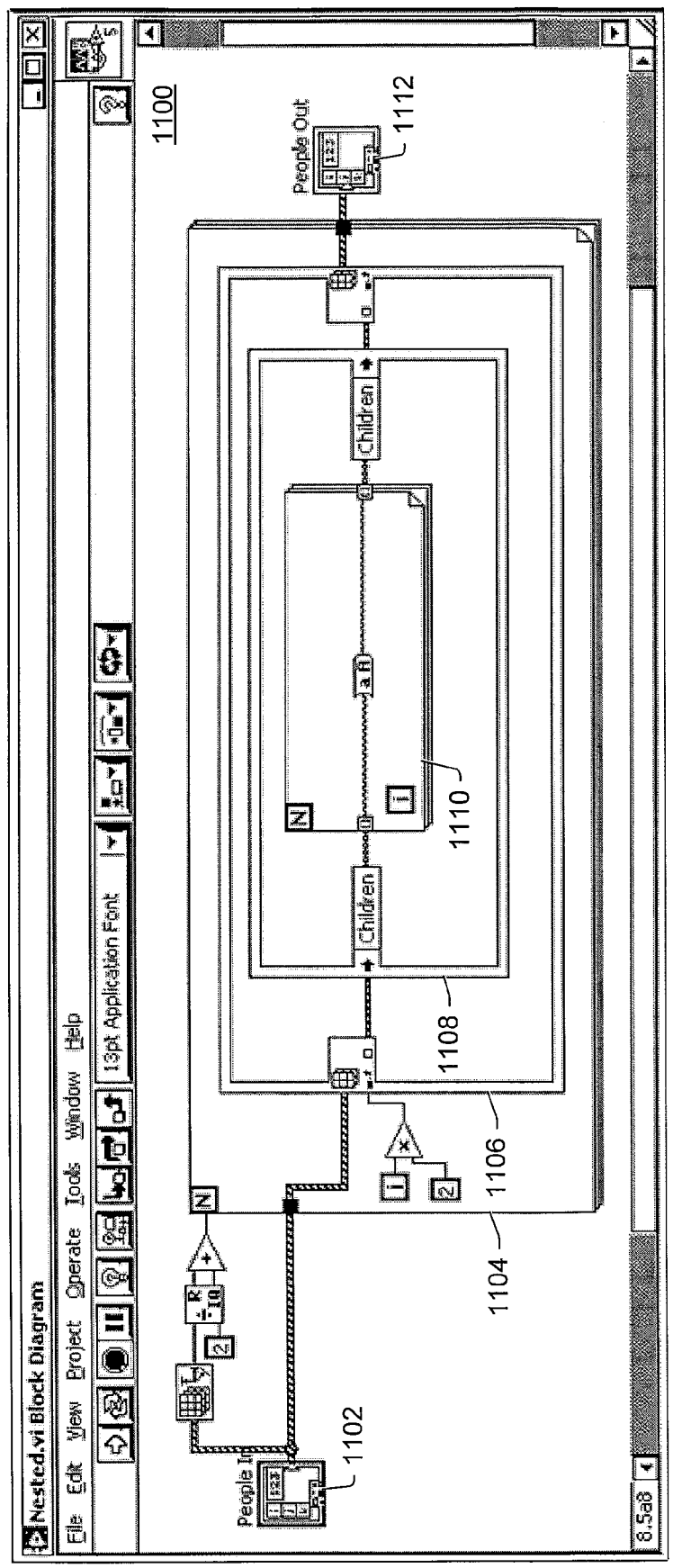

FIG. 11A illustrates a more complicated graphical program 1100 using two in-place structures, a loop structure, and an array of people (i.e., an array of clusters). In this example, the array of people 1102 is provided to the loop structure 1104 which iterates over the people in the array. In this particular case, the graphical program is to fully capitalize all children's names. This particular array only includes children on every even index, and so each even index is provided to in-place structure 1106 which unbundles the provided index from the array (to extract a cluster from the array). The cluster is then unbundled (for element "Children") using the in-place structure 1108. Each letter of the name of the children are capitalized using the loop structure 1110, which is provided to the array of people "People Out" 1112 via the output of loop structure 1110, in-place structure 1108, in-place structure 1106, and the loop structure 1104.

Figure 11B:
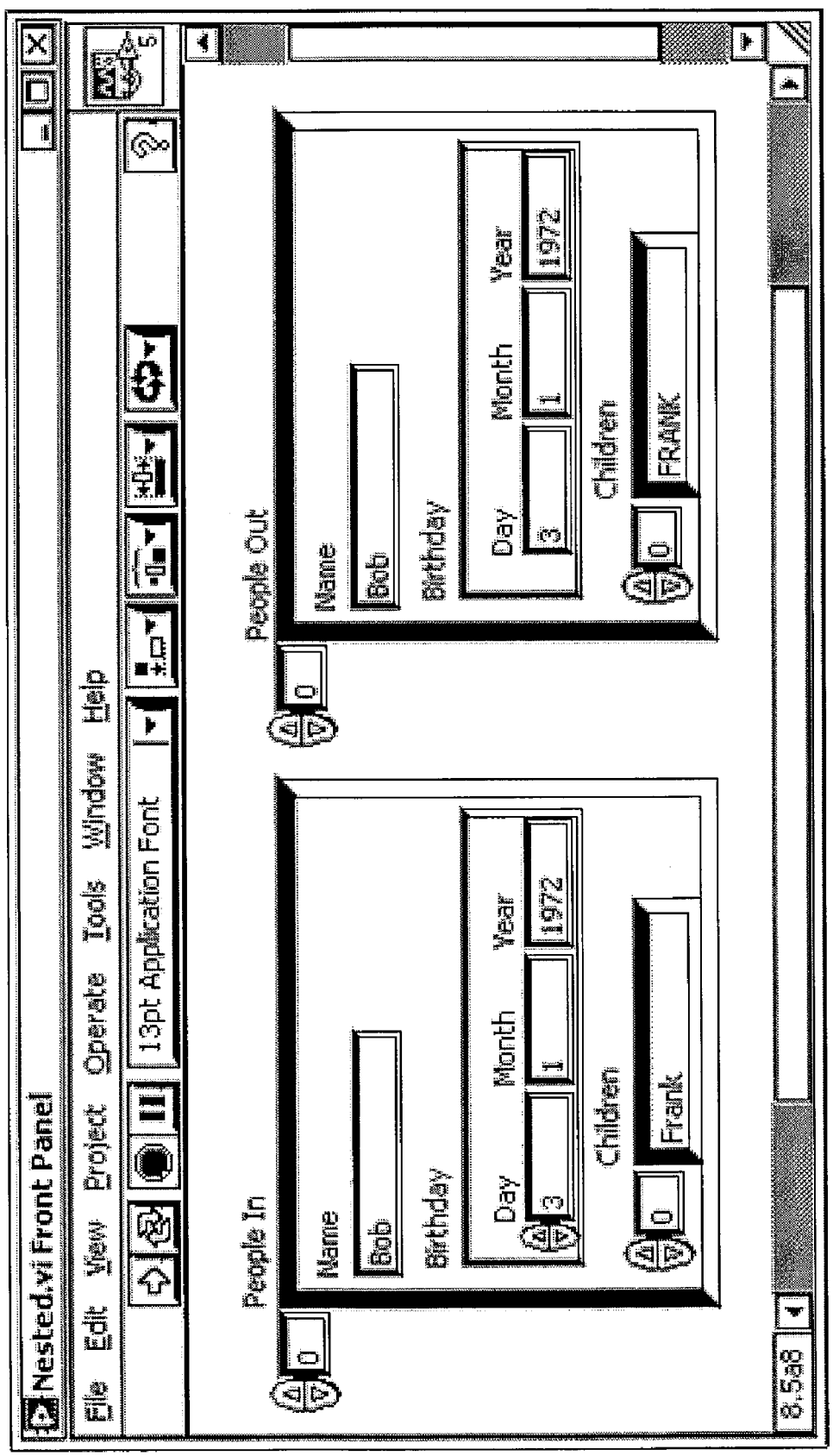

FIG. 11B illustrates a front panel of the graphical program 1100, where The first person in the array, "Bob", has a child name "Frank", whose name is capitalized during execution of the graphical program (as shown in People Out where Children="FRANK").

Thus, FIGS. 5A-11B illustrate screen shots of exemplary graphical programs and in-place structures.

Figure 12:
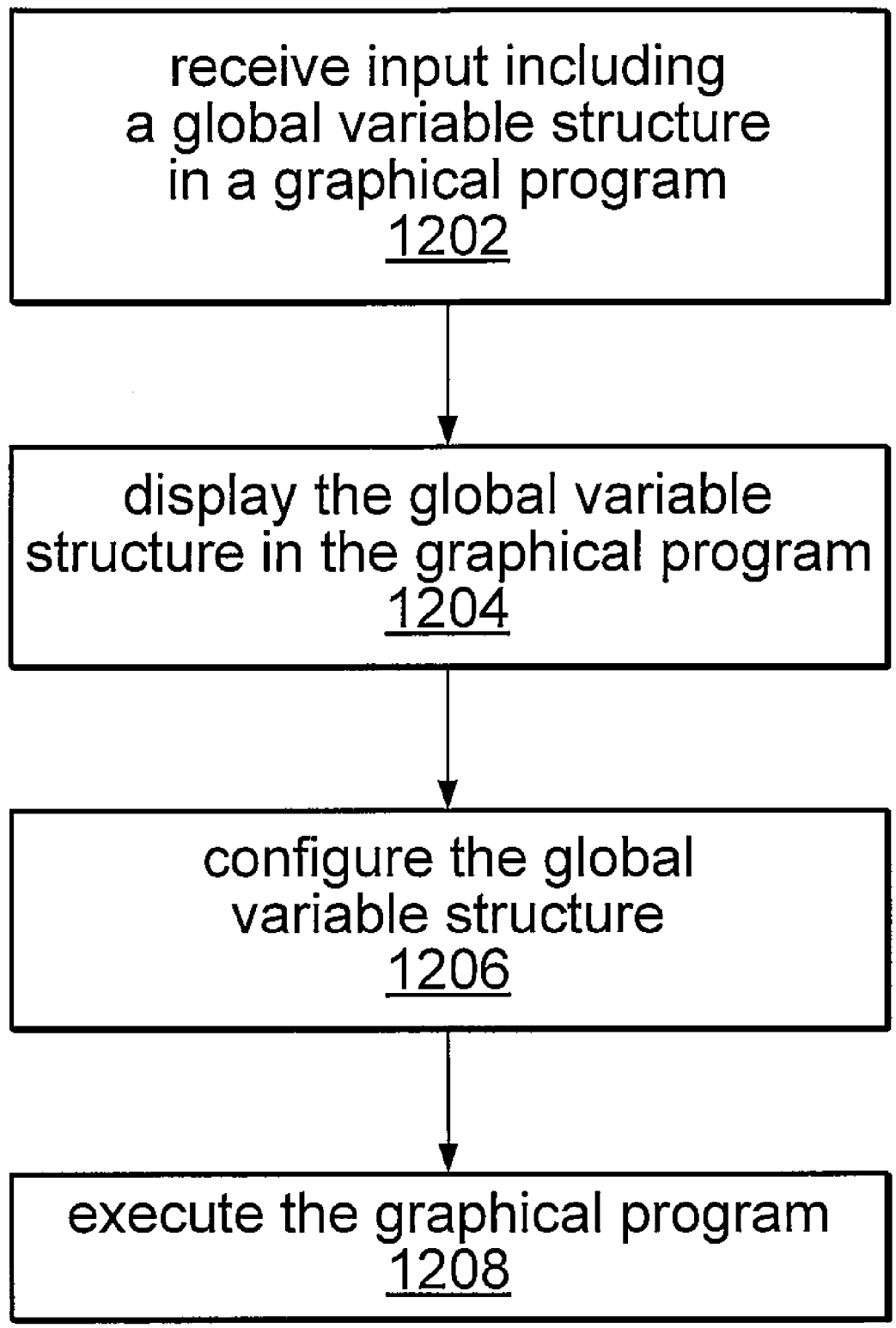
FIG. 12 is a flowchart diagram illustrating one embodiment of a method for including a global variable structure in a graphical program according to one embodiment.

FIG. 12—Method for Including a Global Variable Structure in a Graphical Program

FIG. 12 illustrates a computer-implemented method for specifying a graphical program. More specifically, FIG. 12 illustrates a method for including global variable structure in a graphical program. As indicated above, the graphical program may include a plurality of interconnected nodes which visually represent the graphical program. The method shown in FIG. 12 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1202, input including a structure in the graphical program may be received. In various embodiments, the structure may be referred to as a "global variable" structure. The global variable structure may allow for or ensure deterministic modification of values of global variables. For example, the global variable structure may provide a "lock and key" mechanism for modifying values of global variables; thereby preventing other modifications from occurring in that time, which could yield non-deterministic behavior in the graphical program. As used herein, global variables are intended to include any data container which is accessible in an abstract way by a graphical program. For example, a global variable may include a data container which is defined in the graphical program (e.g., without any connections to other nodes) and which is accessible throughout the graphical program.

Global variable structures may be used to modify any data containers which are not directly connected (e.g., in a wired data flow manner) to entities which modify the value of the data container. In other words, global variable structures may be used to modify any variables which may be modified concurrently and independently. Exemplary data containers include I/O channel variables, typical global variables, and/or other independently referenced data containers.

As indicated above regarding in-place structures, the global variable structure may be included in the graphical program using any of a variety of methods, e.g., including invocation of menus (possibly inside the graphical program or using the development environment's menu system), using a palette (e.g., by dragging the structure from the palette to the graphical program), and/or other methods.

In 1204, the global variable structure may be displayed in the graphical program, e.g., in response to the input including the structure in the graphical program. For example, where the user selects the global variable structure from a palette and 'drops' the structure in the graphical program, the structure may be displayed as a node or containing structure in the graphical program. The global variable structure may have a shape, color, pattern (e.g., around the edge of the structure), etc. which visually indicates that the structure is a global variable structure which is usable for optimizing memory usage of the graphical program. In one embodiment, the global variable structure may be uniquely characterized by having unique in-set terminals which are typically paired across the width of the global variable structure. These terminals may be referred to as "boundary nodes" of the global variable structure. In one embodiment, movement of one of the boundary nodes may results in corresponding movement of the other boundary nodes (i.e., such that movement of one is locked with movement of the other).

In one embodiment, the global variable structure may be rectangular and/or have an interior portion. The interior portion may be usable to receive one or graphical program nodes. Thus, in one embodiment, the structure may include an interior portion operable to receive nodes (e.g., during configuration of the in-place structure). The nodes may be displayed in the interior portion of the global variable structure in the graphical program. In some embodiments, the interior portion may be collapsible (e.g., where, when collapsed, the interior portion is not displayed). Alternatively, the in-place structure may not include an interior portion, but may be selected in the graphical program and a subdiagram (e.g., as a new window in the development environment) may be displayed. The subdiagram may be configured similar to the interior portion described above.

In 1206, the structure may be configured. Configuration of the global variable structure may include association of the global variable with the structure, e.g., connecting the global variable (or a node representing the global variable) to the global variable structure, e.g., to a border node or input terminal of the global variable structure. Alternatively, the global variable structure may be connected to a data reference node which provides a data reference value of the global variable to be modified. In some embodiments, the global variable (or a node representing the global variable) may be connected to the data reference node such that the data reference node can extract a data reference from the global variable node.

Configuration of the global variable structure may further include association of at least one graphical program node with the global variable structure. The at least one graphical program node may be executable to modify the value of the global variable. In some embodiments, where the global variable structure includes an interior portion, the at least one node may be placed in the interior portion of the global variable structure. The at least one node may be connected to the border nodes of the global variable structure and/or input and output nodes connected to the global variable structure.

As one example, a data reference value node associated with a global variable may be connected to a border node of the global variable structure. The border node of the global variable structure may be connected to at least one node which in turn may be coupled to a corresponding border node of the global variable structure. The output of the global variable structure may be connected to another data reference node associated with the global variable. Thus, in this embodiment, the data reference value may provide a data reference of the global variable (thereby locking access to the global variable), the border node may use the data reference to retrieve the value of the global variable, the at least one node may execute to modify the value of the global value, the border node may store the value of the global variable in the memory location referenced by the data reference (with minimal copying which may not be necessary), and the data reference value node may then unlock the global value for editing. In one embodiment, to lock and unlock access of the global variable/container, the data reference node may first retrieve and delete the data reference from the global variable and then (after modification) store the new data reference value in the global variable.

In one embodiment, one or more other nodes may be used to retrieve and delete data references, e.g., for use with the global variable structure. For example, in one embodiment, an array may be connected to a node which creates a new data. More specifically, the node may take an input data value and store it in a particular global variable (or storage container) and provide a reference to that global variable. The node may provide the data reference as an output, e.g., for a global variable structure. The global variable structure may then use the data reference as described above. On output, the border node may provide store the modified value in the memory referenced, and provide the data reference to another node which may delete the data reference value and provide the data, e.g., for storage in a new array, following the example from above.

Where the global variable is referenced for modification multiple times in a graphical program, e.g., using one or more global variable structures, the development environment may determine a specific order to modify the global variable structure in order to avoid deadlocks. Alternatively, or additionally, the user may provide priorities or a specified order which the development environment or run time engine which may adhere to.

In 1208, the graphical program may be executed. The global variable may be modified in a deterministic manner according to the global variable structure(s) of the graphical program.

Figure 13:
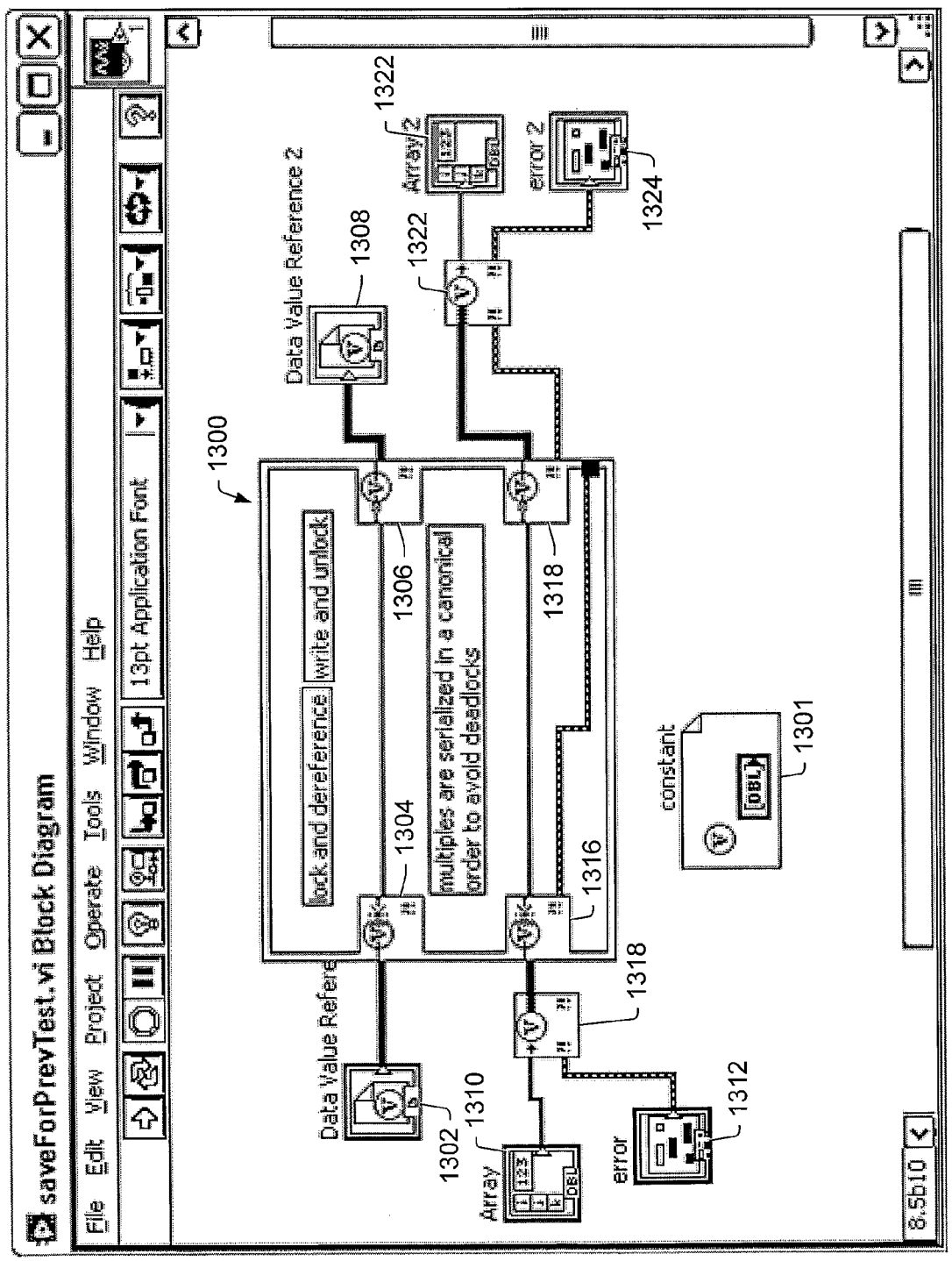
FIG. 13 is a screen shot of an exemplary graphical program including an exemplary global variable structure.

FIG. 13—Exemplary Global Variable Structure in a Graphical Program

FIG. 13 is a screen shot of an exemplary graphical program which includes global variable structure 1300. As shown, data value reference node 1302 is connected to border node 1304, which is connected to border node 1306, which is connected to data value reference node 1308. In this example, data value reference node 1302 provides the data reference to global constant 1301 (thereby locking access to the variable), which is provided to the border node 1302. Border node 1302 receives the reference and provides the data value of the global variable for manipulation. Typically, at least one node for modification of the variable data would be interposed between the border node 1304 and 1306. After such modification, 1306 provides the data reference value of the stored data to data value reference node 1308 which unlocks access to the global variable.

Also shown in the global variable structure 1300 is another method for manipulation of a global variable. As shown, an array 1310 and error 1312 are connected to new data value reference node 1314 which takes the array as input data and stores it in the global storage container 1301 and provides a data value reference. This data value reference is then provided to border node 1316 which retrieves the data value based on the data reference (and would typically be provided to at least one node for modification). After such modification, border node 1318 may execute to provide the data reference of the modified data which is provided to node 1320 which may take the data value reference, delete it from the global storage container, and provide the data value which was stored in the global storage container. This information is provided to array 1322 as well as any error information to error node 1324.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-implemented method, comprising:
utilizing a computer to perform:
receiving input specifying a graphical program, wherein the graphical program comprises a plurality of interconnected nodes which visually represents the graphical program;
wherein said receiving input specifying the graphical program comprises:
receiving input including a graphical structure in the graphical program;
associating a global variable with the graphical structure; and
displaying the graphical structure in the graphical program based on the user input; and
associating at least one node in the graphical program with the graphical structure, wherein the at least one node is executable to modify the value of the global variable, wherein the graphical structure is distinct from the global variable, wherein the graphical structure comprises an interior portion, wherein said associating comprises placing the at least one node in the interior portion of the graphical structure, and wherein said associating does not include editing the at least one node; and
wherein during execution of the graphical program the graphical structure ensures deterministic modification of values of the global variable, wherein the deterministic modification prevents other modifications to the value of the global variable by any other nodes during the deterministic modification.

2. The method of claim 1, further comprising:
compiling the graphical program;
wherein, in response to the graphical structure, said compiling comprises creating program instructions executable to prevent modification of the global variable by other code during modification of the global variable by the at least one node.

3. The method of claim 1, further comprising:
executing the graphical program, wherein said executing comprises:
providing the global variable to the graphical structure;
the at least one node modifying the global variable;
preventing modification of the global variable by other graphical program code during said modifying, wherein said preventing is performed based on presence of the graphical structure.

4. The method of claim 1, wherein said associating the global variable with the graphical structure comprises connecting a data value reference number node to the graphical structure.

5. The method of claim 1, wherein the graphical structure has an appearance that visually indicates that the graphical structure ensures deterministic modification of values of the global variable.

6. A non-transitory computer-accessible memory medium comprising program instructions executable by a processor to:
receive input specifying a graphical program, wherein the graphical program comprises a plurality of interconnected nodes which visually represents the graphical program;
wherein said receiving input specifying the graphical program comprises:
receiving input including a graphical structure in the graphical program;
associating a global variable with the graphical structure; and
displaying the graphical structure in the graphical program based on the user input;
associating at least one node in the graphical program with the graphical structure, wherein the at least one node is executable to modify the value of the global variable, wherein the graphical structure is distinct from the global variable, wherein the graphical structure comprises an interior portion, wherein said associating comprises placing the at least one node in the interior portion of the graphical structure, and wherein said associating does not include editing the at least one node;
wherein during execution of the graphical program the graphical structure ensures deterministic modification of values of the global variable, wherein the deterministic modification prevents other modifications to the value of the global variable by any other nodes during the deterministic modification.

7. The non-transitory computer-accessible memory medium of claim 6, wherein the program instructions are further executable to:
compile the graphical program, wherein, in response to the graphical structure, said compiling comprises creating program instructions executable to prevent modification of the global variable by other code during modification of the global variable by the at least one node.

8. The non-transitory computer-accessible memory medium of claim 6, wherein the program instructions are further executable to:
execute the graphical program, wherein said executing comprises:
providing the global variable to the graphical structure;
the at least one node modifying the global variable;
preventing modification of the global variable by other graphical program code during said modifying, wherein said preventing is performed based on presence of the graphical structure.

9. The non-transitory computer-accessible memory medium of claim 6, wherein said associating the global variable with the graphical structure comprises connecting a data value reference number node to the graphical structure.

10. The non-transitory computer-accessible memory medium of claim 6, wherein the graphical structure has an appearance that visually indicates that the graphical structure ensures deterministic modification of values of the global variable.

* * * * *